US009313409B2

(12) United States Patent
Kim et al.

(10) Patent No.: US 9,313,409 B2
(45) Date of Patent: Apr. 12, 2016

(54) MOBILE TERMINAL AND CONTROL METHOD THEREOF

(71) Applicant: LG ELECTRONICS INC., Seoul (KR)

(72) Inventors: Hyun Kim, Seoul (KR); Wonbeom Lee, Seoul (KR); Younghan Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/320,218

(22) Filed: Jun. 30, 2014

(65) Prior Publication Data

US 2015/0124125 A1   May 7, 2015

(30) Foreign Application Priority Data

Nov. 6, 2013   (KR) .......................... 10-2013-0134327

(51) Int. Cl.
  *H04N 5/262* (2006.01)
  *H04N 5/232* (2006.01)
  *H04N 5/272* (2006.01)

(52) U.S. Cl.
  CPC ........... *H04N 5/23293* (2013.01); *H04N 5/232* (2013.01); *H04N 5/23216* (2013.01); *H04N 5/2628* (2013.01); *H04N 5/272* (2013.01)

(58) Field of Classification Search
  CPC ... H04N 5/272; H04N 5/23293; H04N 5/232; H04N 5/23216; H04N 5/2628
  USPC ........ 348/222.1, 239, 333.01, 333.05, 333.12
  See application file for complete search history.

(56) References Cited

U.S. PATENT DOCUMENTS

| | | | |
|---|---|---|---|
| 7,734,070 B1 * | 6/2010 | Sharma et al. ................. | 382/118 |
| 2003/0117501 A1 | 6/2003 | Shirakawa | |
| 2005/0204287 A1 * | 9/2005 | Wang ............................. | 715/716 |
| 2012/0008011 A1 * | 1/2012 | Garcia Manchado . | G03B 15/08 |
| | | | 348/231.2 |
| 2012/0120186 A1 * | 5/2012 | Diaz et al. ........................ | 348/36 |
| 2012/0268552 A1 * | 10/2012 | Choi ..................... | H04N 7/147 |
| | | | 348/14.07 |
| 2012/0274808 A1 * | 11/2012 | Chong et al. .................. | 348/234 |
| 2013/0038759 A1 | 2/2013 | Jo et al. | |
| 2013/0120602 A1 | 5/2013 | Huang | |
| 2013/0235223 A1 | 9/2013 | Park et al. | |
| 2013/0235224 A1 * | 9/2013 | Park et al. .................. | 348/218.1 |
| 2014/0092038 A1 * | 4/2014 | Ichinowatari et al. ........ | 345/173 |

OTHER PUBLICATIONS

European Patent Office Application Serial No. 14180708.1, Search Report dated Dec. 10, 2014, 5 pages.

* cited by examiner

*Primary Examiner* — Sinh Tran
*Assistant Examiner* — Zhenzhen Wu
(74) *Attorney, Agent, or Firm* — Lee, Hong, Degerman, Kang & Waimey

(57) ABSTRACT

The present disclosure provides a mobile terminal, including a first camera and a second camera that are configured to operate simultaneously, a display unit that is configured to output a first image captured by the first camera and at least part of a second image captured by the second camera in an overlaying manner, and a controller that is configured to set an output position of the at least part of the second image in a manner of preventing the at least part of the second image from being overlaid on a specific object included in the first image.

19 Claims, 22 Drawing Sheets

MOBILE TERMINAL AND CONTROL METHOD THEREOF

CROSS-REFERENCE TO RELATED APPLICATION

Pursuant to 35 U.S.C. §119(a), this application claims the benefit of earlier filing date and right of priority to Korean Application No. 10-2013-0134327, filed on Nov. 6, 2013, the contents of which is incorporated by reference herein in its entirety.

BACKGROUND OF THE DISCLOSURE

1. Field of the Disclosure

This specification relates to a mobile terminal having a plurality of cameras simultaneously operating in a dual capturing mode, and a control method thereof.

2. Background of the Disclosure

Mobile terminals are electronic devices which are portable and have at least one of voice and telephone call functions, information input and/or output functions, a data storage function and the like.

As it becomes multifunctional, the mobile terminal can be allowed to capture still images or moving images, play music or video files, play games, receive broadcast and the like, so as to be implemented as an integrated multimedia player.

Many efforts are undergoing to support and enhance various functions as such multimedia player in view of hardware or software improvements. As one example, a user interface environment is provided in order for users to easily and conveniently search for or select functions.

Meanwhile, the mobile terminal may be provided with a plurality of cameras to capture a still image or a video. In a dual capturing mode in which those cameras are operating simultaneously, images captured by the plurality of cameras, respectively, may be output on a display unit.

In general, in the dual capturing mode, one camera captures an object, and another camera captures a user. Here, when the user views an image with the object captured, the user may suffer from caring for the user's own image. This may cause a difficulty for the user to make for a desired composition. It may be considerably difficult to capture an image with appropriately adjusting a distance between the one camera and the object and a distance between the another camera and the user. This may be especially so when the object or the user moves to a different position.

SUMMARY OF THE DISCLOSURE

Therefore, an aspect of the detailed description is to provide a mobile terminal, capable of selecting an output position of an image, which is captured by another camera, based on a position of a specific object included in an image captured by one camera, and a control method thereof.

To achieve these and other advantages and in accordance with the purpose of this specification, as embodied and broadly described herein, there is provided a mobile terminal, including a first camera and a second camera that are configured to operate simultaneously in a dual capturing mode, a display unit that is configured to output a first image captured by the first camera and at least part of a second image captured by the second camera in an overlaying manner in the dual capturing mode, and a controller that is configured to set an output position of the at least part of the second image in a manner of preventing the at least part of the second image from being overlaid on a specific object included in the first image.

In accordance with one exemplary embodiment disclosed herein, the specific object may be a face of a person included in the first image, and the controller may detect a background area excluding the person's face, so as to place the at least part of the second image on the background area.

The controller may divide the background area into a plurality of areas avoiding the person's face, and place the at least part of the second image within one of the plurality of areas.

In accordance with another exemplary embodiment disclosed herein, the at least part of the second image may be changed in position, without being overlaid on the specific object in a continuous manner, when a position of the specific object output on the display unit is changed.

In accordance with another exemplary embodiment disclosed herein, a setting screen for changing a setting of the controller may be output when the at least part of the second image is touched.

In accordance with another exemplary embodiment disclosed herein, in a state where the at least part of the second image is output on the display unit without being overlaid on the specific object, when the specific object is selected by a preset touch input, the at least part of the second image may be output to be overlaid on the specific object.

The preset touch input may include a touch input that the at least part of the second image is touched and then dragged to be moved. The at least part of the second image may be output to be overlaid on the specific object when the at least part of the second image approaches the specific object within a predetermined range.

When the at least part of the second image approaches the specific object within the predetermined range, the at least part of the second image may be attracted to the specific object and located to be overlaid on the specific object even though the touch applied to the at least part of the second image is released.

At least one of a position and a size of the at least part of the second image may be changed while the at least part of the second image is overlaid on the specific object, when the at least one of a position and a size of the specific object output on the display unit is changed.

In accordance with another exemplary embodiment disclosed herein, in a state where the at least part of the second image is output on the display unit without being overlaid on the specific object, when the specific object is selected, the at least part of the second image may be output with a preset interval from the specific object.

When the specific object is moved, the at least part of the second image may be moved with maintaining the preset interval from the specific object.

The preset interval may be set based on a preset touch input. The preset touch input may include a start point where the at least part of the second image is touched, and a release point where the touch is released after the at least part of the second image is dragged in the touched state. The controller may set an interval between the specific object and the release point as the preset interval.

In accordance with another exemplary embodiment disclosed herein, the controller may detect a face of a person included in the second image, and place the person's face within at least part of the first image.

The controller may detect a face of a person captured by the second camera, and set the at least part of the second image output on the display unit based on the detected person's face.

In accordance with another exemplary embodiment disclosed herein, the specific object may be a face of a person located within the first image, and the controller may adjust a size of a person's face located within the at least part of the second image according to the size of the person's face located within the first image.

To achieve these and other advantages and in accordance with the purpose of this specification, as embodied and broadly described herein, there is provided a control method for a mobile terminal, including acquiring a first image and a second image by a first camera and a second camera, respectively, in a dual capturing mode, setting a relative output position of the second image with respect to the first image based on a specific object included in the first image, and outputting the second image on a display unit in a manner of overlaying the second image on the first image based on the setting.

In accordance with one exemplary embodiment disclosed herein, the setting step may include setting the output position in a manner that the second image is prevented from being overlaid on the specific object.

In accordance with another exemplary embodiment disclosed herein, the setting step may include changing the output position of the second image based on a position change of the specific object when the position change of the specific object output on the display unit is caused.

In accordance with another exemplary embodiment disclosed herein, the setting step may include detecting a person's face located within the second image, and placing the detected person's face on a central portion of the first image.

The setting step may include detecting faces of persons included in the first and second images, and adjusting the size of the person's face included in the second image according to the size of the person's face included in the first image.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of a mobile terminal and a control method thereof according to the exemplary embodiments, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function.

In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, and the like. However, it may be easily understood by those skilled in the art that the configuration according to the exemplary embodiments of this specification can also be applied to stationary terminals such as digital TV, desktop computers and the like, excluding a case of being applicable only to the mobile terminals.

FIG. 1A is a block diagram of a mobile terminal in accordance with the present disclosure.

Figure 1:
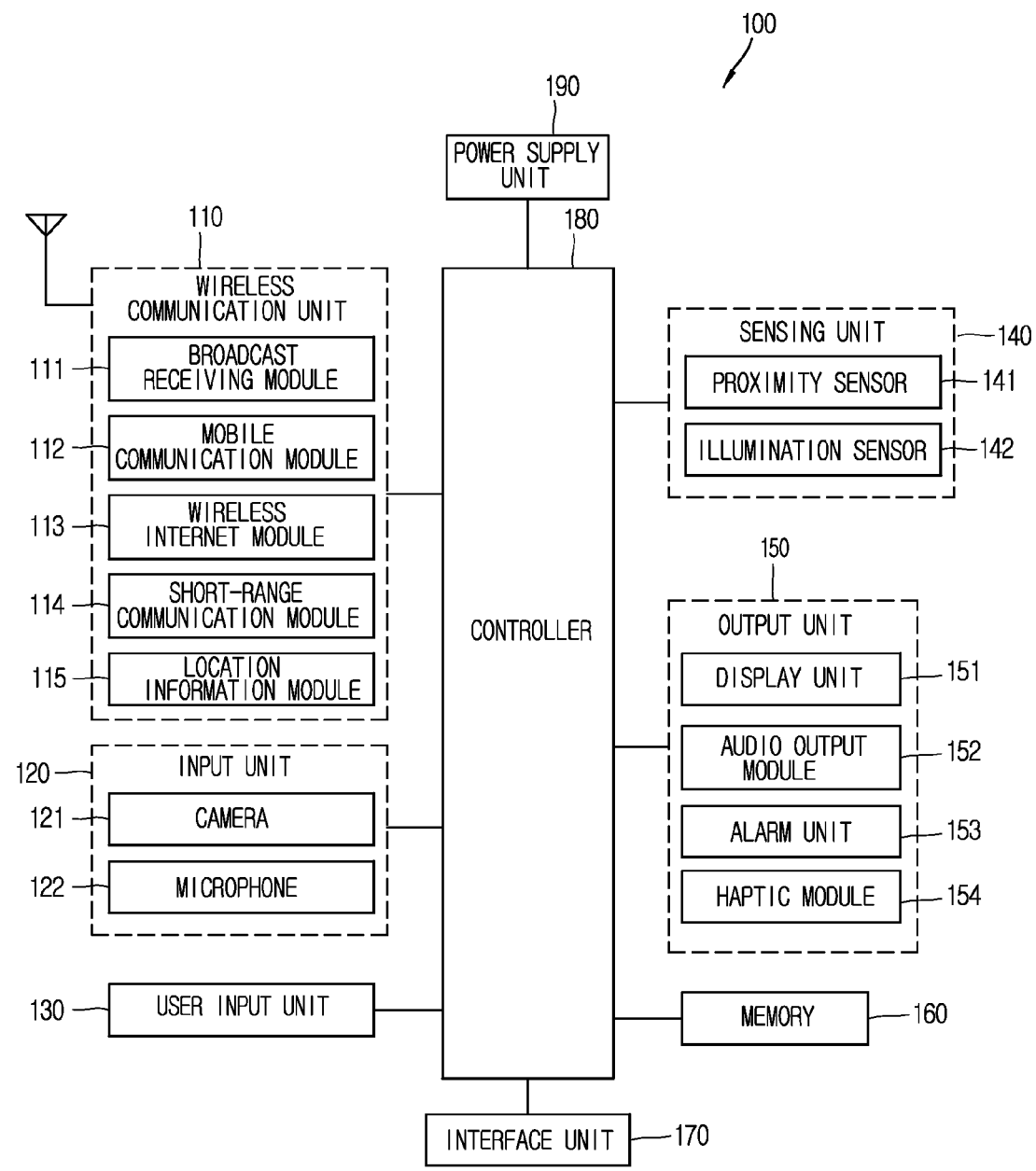
FIG. 1 is a block diagram of a mobile terminal in accordance with one exemplary embodiment of the present disclosure.

The mobile terminal 100 may include a wireless communication unit 110, an Audio/Video (A/V) input unit 120, a user input unit 130, a sensing unit 140, an output unit 150, a memory 160, an interface unit 170, a controller 180, a power supply unit 190, and the like. However, all of the elements as illustrated in FIG. 1 are not necessarily required, and the mobile terminal may be implemented with greater or less number of elements than those illustrated elements.

Hereinafter, the constituent elements will be described in turn.

The wireless communication unit 110 typically includes one or more elements allowing radio communication between the mobile terminal 100 and a wireless communication system, or allowing radio communication between the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel.

The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast signal may include a TV broadcast signal, a radio broadcast signal and a data broadcast signal as well as a broadcast signal in a form that a data broadcast signal is coupled to the TV or radio broadcast signal.

The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems.

Broadcast signals and/or broadcast associated information received via the broadcast receiving module 111 may be stored in a suitable device, such as a memory 160.

The mobile communication module 112 transmits and/or receives a radio signal to and/or from at least one of a base station, an external terminal and a server over a mobile communication network. In this exemplary embodiment, the radio signal may include a voice call signal, a video call signal and/or various types of data according to text and/or multimedia message transmission and/or reception.

The mobile communication module 112 may implement a video call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, and the like.

The location information module 115 denotes a module for detecting or calculating a position of a mobile terminal. An example of the location information module 115 may include a Global Position System (GPS) module.

Still referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Also, user's position information and the like may be calculated from the image frames acquired by the camera 121. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device.

The output unit 150 is configured to output an audio signal, a video signal or a tactile signal. The output unit 150 may include a display unit 151, an audio output module 152, an alarm unit 153 and a haptic module 154.

The display unit 151 may output information processed in the mobile terminal 100. For example, when the mobile terminal is operating in a phone call mode, the display unit 151 will provide a User Interface (UI) or a Graphic User Interface (GUI), which includes information associated with the call. As another example, if the mobile terminal is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display or the like.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the displays 151 may be arranged on one surface to be spaced apart from or integrated with each other, or may be arranged on different surfaces.

Here, if the display unit 151 and a touch sensitive sensor (referred to as a touch sensor) have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure.

When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched.

Still referring to FIG. 1, a proximity sensor may be arranged at an inner region of the mobile terminal 100 covered by the touch screen, or near the touch screen. The proximity sensor may be provided as one example of the sensing unit 140. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor may sense proximity touch, and proximity touch patterns (e.g., distance, direction, speed, time, position, moving status, etc.). Information relating to the sensed proximity touch and the sensed proximity touch patterns may be output onto the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a receiver, a speaker, a buzzer or the like.

The alarm unit 153 outputs signals notifying occurrence of events from the mobile terminal 100. The events occurring from the mobile terminal 100 may include a call received, a message received, a key signal input, a touch input, and the like. The alarm unit 153 may output not only video or audio signals, but also other types of signals such as signals notifying occurrence of events in a vibration manner. Since the video or audio signals can be output through the front display unit 151 or the audio output unit 152, the front display unit 151 and the audio output module 152 may be categorized into a part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal 100 with external devices. The interface unit 170 may allow a data reception from an external device, a power delivery to each component in the portable terminal 100, or a data transmission from the portable terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The controller 180 may also execute a lock state in which a user is restricted from inputting a control command for applications when a state of the mobile terminal meets a set condition. Also, the controller 180 may control a lock screen displayed in the lock state based on a touch input sensed on the display unit 151.

The power supply 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, microprocessors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations.

The software codes can be implemented with a software application written in any suitable programming language. Also, the software codes may be stored in the memory 160 and executed by the controller 180.

Figure 2A:
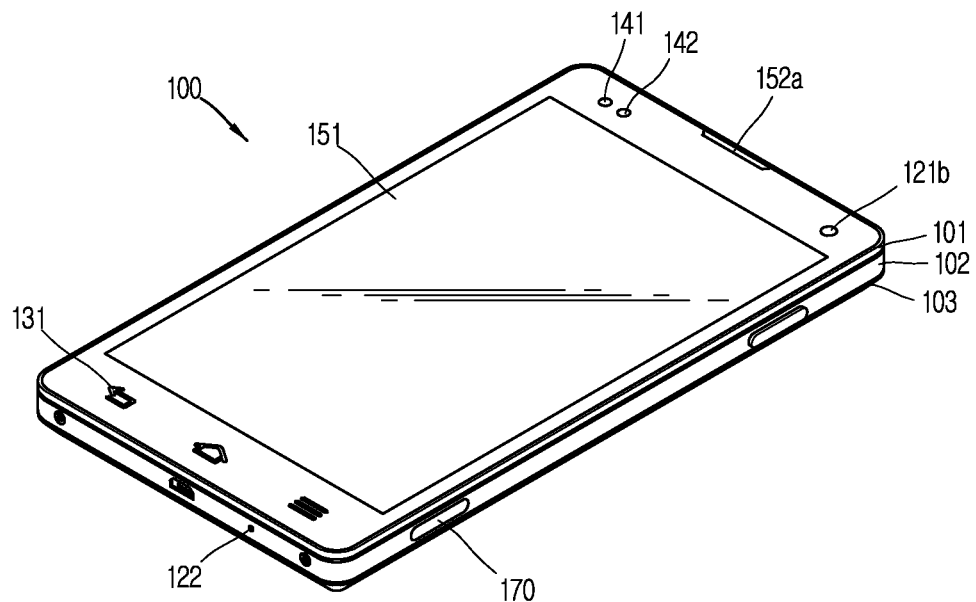
FIG. 2A is a front perspective view of one example of a mobile terminal according to the present disclosure.

FIG. 2A is a front perspective view of a mobile terminal 100 in accordance with one exemplary embodiment.

The mobile terminal 100 shown in FIG. 2 has a bar type terminal body. However, this detailed description may be applicable, but not limited to, a watch type, a clip type, a glass type, or a various structures, such as a slide type, a folder type, a swing type, a swivel type and the like, having two or more bodies coupled to be relatively movable with each other.

The terminal body may include a case (or referred to as casing, housing, cover, etc.) defining an appearance of the mobile terminal 100. In this exemplary embodiment, a main body may be divided into a front case 101 and a rear case 102. Various electronic components may be mounted in a space formed between the front case 101 and the rear case 102. A cover 103 may be coupled to the front or rear case 101 or 102 to define a rear appearance of the mobile terminal 100.

Such cases may be injected using a synthetic resin or be formed of a metal, such as stainless steel (STS), titanium (Ti), aluminum (Al) or the like.

The front surface of the terminal body is shown having a display unit 151, a proximity sensor 141, a light sensor 142, a first audio output module 152a, a camera 121b, a first manipulation unit 131 and the like, and a side surface thereof is shown having a microphone 122, an interface unit 170, a second manipulation unit 132 and the like.

The display unit 151 may output information processed in the mobile terminal 100. The display unit 151 may be implemented to display (output) visual information using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display or the like.

The display unit 151 may include a touch sensing unit for receiving a control command input in a touch manner. When a portion on the display unit 151 is touched, the touch sensing unit may sense the touch input and a content corresponding to the touched portion may be input. The contents input in the touch manner may include text or numerals or menu items which are instructed or selected in various modes.

Touch sensing unit may be transparent such that visual information output on the display unit 151 can be viewed, and have a structure for enhancing visibility of a touch screen at a bright place. In FIG. 1, the display unit 151 may occupy most of the front surface of the front case 101.

The proximity sensor 141, the light sensor 142, the first audio output module 152a and the camera 121b may be disposed at a region adjacent to one of both end portions of the display unit 150, and the first manipulation unit 131 and the microphone 122 may be disposed at a region adjacent to another end. A second manipulation unit 132 (see FIG. 2), an interface unit 170 and the like may be disposed at a side surface of the terminal body.

The proximity sensor 141 may detect whether or not an object exists within a predetermined detection area, and be used to control other components including the display unit 151. As one example, the proximity sensor 141 may be disposed adjacent to the display unit 151 to control the display unit 151 to be deactivated when a user puts the terminal body onto his face to place or receive a call.

The light sensor 142 may sense brightness of ambient light of the terminal body. The mobile terminal 100 may automatically adjust lighting of the display unit 151 according to an amount of ambient light using the light sensor 142.

The first audio output module 152a may be implemented as a receiver to transfer a call sound to a user's ear, or a loud speaker for outputting various alarm sounds or multimedia reproduction sounds.

Sounds generated from the first audio output module 152a may be emitted through an assembly gap between structures. Here, a separately formed hole for outputting sounds may not be viewed or be hidden from the outside, thereby more simplifying the appearance of the terminal 100.

The camera 121b may process image frames of still pictures or video obtained by image sensors in a video call mode or a capturing mode. The processed image frames may be displayed on a display unit 151.

A user input unit may be manipulated to allow inputting of commands for controlling operations of the mobile terminal 100, and include first and second manipulation units 131 and 132. The first and second manipulation units 131 and 132 may be referred to as a manipulating portion. Such manipulating portion can employ any tactile manner that a user can touch, push, scroll or the like for manipulation.

The drawings illustrate the first manipulation unit 131 as a touch key, but the present disclosure may not be limited to the type. For example, the first manipulation unit 131 may be implemented as a mechanical key or a combination of a touch key and the mechanical key.

Contents input by the first and second manipulation units 131 and 132 may be set variously. For example, the first manipulation unit 131 may be configured to input commands such as menu, home, cancel, search or the like, and the second manipulation unit 132 may be configured to input commands, such as a volume adjustment of sounds output from the first audio output module 160, conversion of the display unit 150 into a touch recognition mode, or the like.

The microphone 122 may receive user's voice, other sounds and the like. The microphone 122 may be disposed in various places to receive stereo sound.

The interface unit 170 may serve as a path for data exchange between the mobile terminal 100 and external devices. For example, the interface unit 170 may be at least one of wired/wireless earphone ports, ports for short-range communication (e.g., IrDA, Bluetooth, WLAN, etc.), power supply terminals for power supply to the mobile terminal and the like. The interface unit 170 may be a card socket for coupling to external cards, such as a Subscriber Identity Module (SIM), a User Identity Module (UIM), a memory card for storage of information and the like.

Figure 2B:
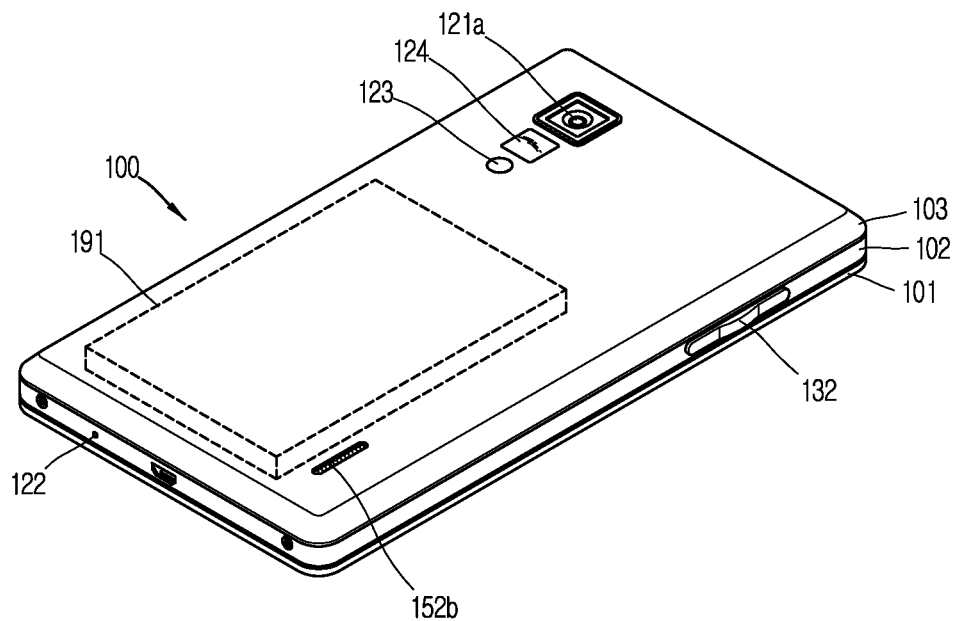
FIG. 2B is a rear perspective view of the mobile terminal illustrated in FIG. 2A.

FIG. 2B is a rear perspective view of the mobile terminal 100 illustrated in FIG. 2A.

Referring to FIG. 2B, the rear surface of the terminal body is further shown having a camera 121a. The camera 121a faces a direction which is substantially opposite to a direction faced by the camera 121b (see FIG. 2A). Also, the camera 121a may be a camera having different pixels from those of the camera 121b.

For example, the camera 121b may operate with relatively lower pixels (lower resolution). Thus, the camera 121b may be useful when a user can capture his face and send it to another party during a video call or the like. On the other hand, the camera 121a may operate with relatively higher pixels (higher resolution) such that it can be useful for a user to obtain higher quality pictures for later use.

A flash 123 and a mirror 124 may be disposed adjacent to the camera 121a. The flash 123 operates in conjunction with the camera 121a when taking a picture using the camera 121a. The mirror 124 can cooperate with the camera 121a to allow a user to photograph himself in a self-portrait mode.

A second audio output module 152b may further be disposed on the rear surface of the terminal body. The second audio output module 152b may cooperate with the first audio output unit 152a (see FIG. 2A) to provide stereo output in a phone-call mode, and be used to implement a speakerphone mode during a call connection.

A broadcast signal receiving antenna (not shown) may further be disposed at the side surface of the terminal body, in addition to an antenna for call connection. The antenna forming a part of the broadcast receiving module may be retractable into the terminal body.

The terminal body is shown having a power supply unit 190 (see FIG. 1) for supplying power to the mobile terminal 100. The power supply unit 190 may be implemented as a battery 191 for converting chemical energy into electrical energy, and the battery may be mounted inside the terminal body or detachably coupled to the terminal body.

As described above, the cameras 121a and 121b may be disposed on the rear and front surfaces of the terminal body, respectively. Hereinafter, the camera disposed on the rear surface of the terminal body may be referred to as a first camera 121a, and the camera disposed on the front surface of the terminal body may be referred to as a second camera 121a, for the sake of explanation. This is merely illustrative, and the present disclosure may not be limited to this. That is, the first and second cameras may also be construed as cameras disposed on the front and rear surfaces of the terminal body, respectively.

Figure 3:
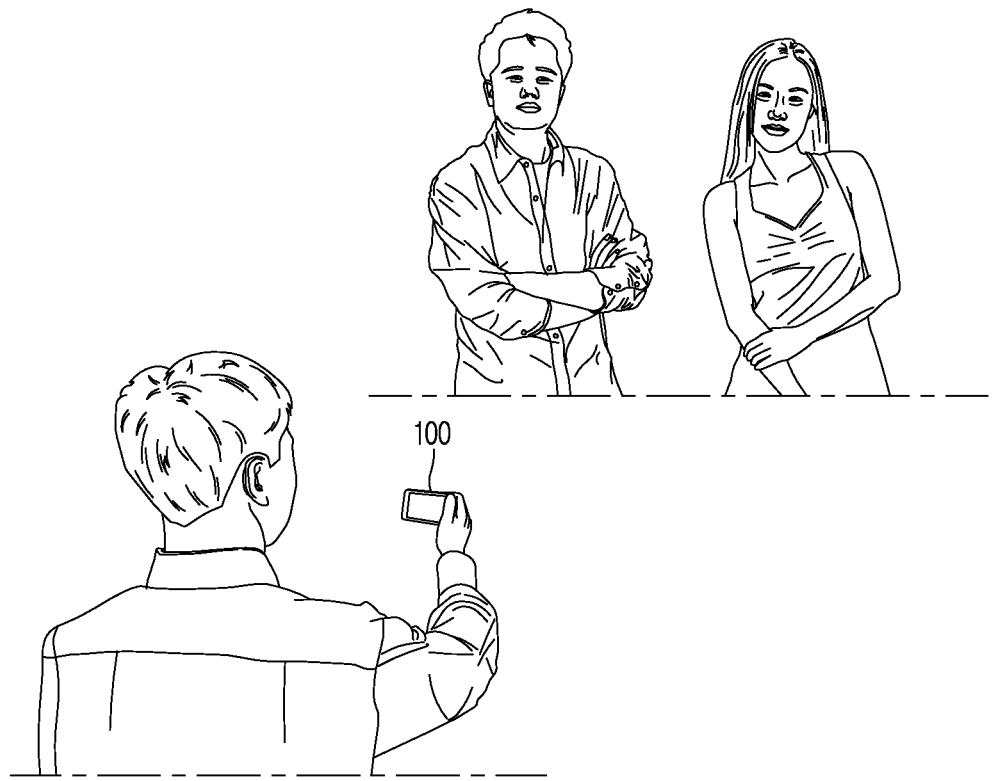
FIGS. 3 and 4 are conceptual views illustrating a dual capturing mode for capturing images by simultaneously operating first and second cameras illustrated in FIGS. 2A and 2B.
Figure 4:
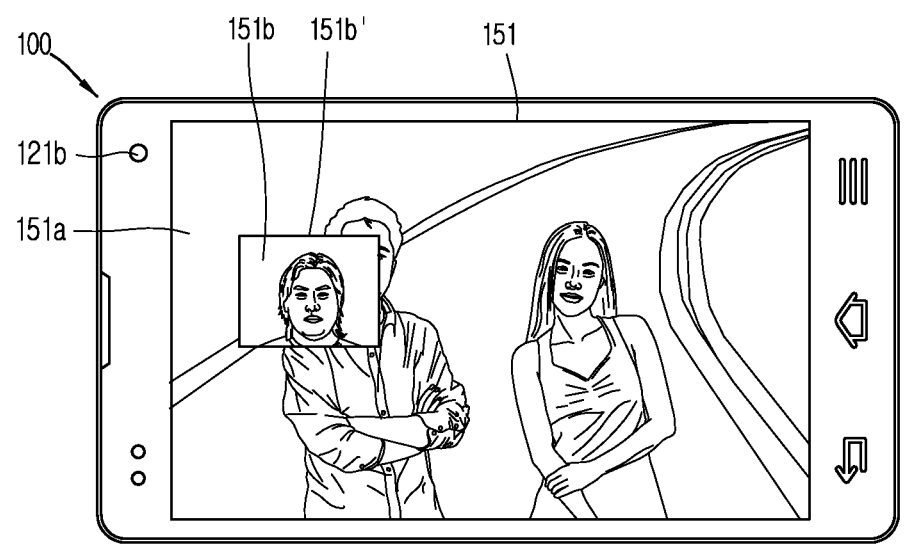

FIGS. 3 and 4 are conceptual views illustrating a dual capturing mode for capturing images by simultaneously operating the first and second cameras 121a and 121b illustrated in FIGS. 2A and 2B.

As illustrated in FIG. 3, the mobile terminal 100 may support a general capturing mode in which the first camera 121a and the second camera 121b are operating in an independent manner, and a dual capturing mode in which the first and second cameras 121a and 121b are operating in a simultaneous manner.

In the dual capturing mode, the first and second cameras 121a and 121b may operate simultaneously, such that the first camera 121a can capture an object located at the rear side of the terminal body and the second camera 121b can capture an object located at the front side of the terminal body. The drawing illustrates an exemplary use of the dual capturing mode in which the user (a photographer, i.e., a person who photographs an image) captures the user's own image while capturing a plurality of figures (persons).

The dual capturing mode may have an advantage in that objects located in different directions can be captured and documented. Images captured by the first and second cameras 121a and 121b may be stored in the memory 160 (see FIG. 1) as separate images from each other, or by being combined into one image. In addition, it may be obvious that an image file in a combination form of those images, as well as an image file of each image captured by the first and second cameras 121a and 121b, may also be stored in the memory 160. This storage method may change by a user's setting.

FIG. 4 illustrates that images captured by the first and second cameras 121a and 121b are output, respectively, on the display unit 151 in the dual capturing mode.

In the dual capturing mode, prior to receiving a control command applied for actual capturing (image acquisition), first and second images 151a and 151b which are currently captured by the first and second cameras 121a and 121b may be output on the display unit 151, respectively. This may be understood as a preview state in which the first and second images 151a and 151b to be captured are shown to the user in advance. The user may change a capturing composition into a desired composition in the preview state. Also, the display unit 151 may output not only the first and second images 151a and 151b but also setting information for changing settings associated with image capturing. Hereinafter, the dual capturing mode may be a state in which a still image or a video is actually captured or the preview state.

In the dual capturing mode, the controller 180 may control the display unit 151 to output the first and second images 151a and 151b in such a manner that at least part of the second image 151b captured by the second camera 121b is overlaid on the first image 151a captured by the first camera 121a.

As illustrated, the at least part of the second image 151b may be output on a floating window 151b'. The floating window 151b' may arouse a visual effect like floating above the first image 151a. Accordingly, a part of the first image 151a, which is overlaid by the floating window 151b', may be invisible due to being obscured by the floating window 151b'. The floating window 151b' may change in position depending on situations, which will be explained later.

Meanwhile, the floating window 151b' may be provided with an edge portion for discriminating a boundary between at least part of the inner second image 151b and the outer first image 151a. A color, a shape and the like of the edge portion may be changed by the user's setting. The drawing exemplarily illustrates the floating window 151b' without a separate visual effect given for the edge portion.

As illustrated, when the first camera 121a captures a person and the second camera 121b captures the user, the floating window 151b' may be output in a state of being overlaid on a face of the person. In this case, the user should change a capturing composition to prevent the floating window 151b' from being overlaid on the person's face, or change an output position of the floating window 151b' through manipulation.

Hereinafter, description will be given of the mobile terminal 100, which is capable of enhancing user convenience by solving the above issue.

Figure 5:
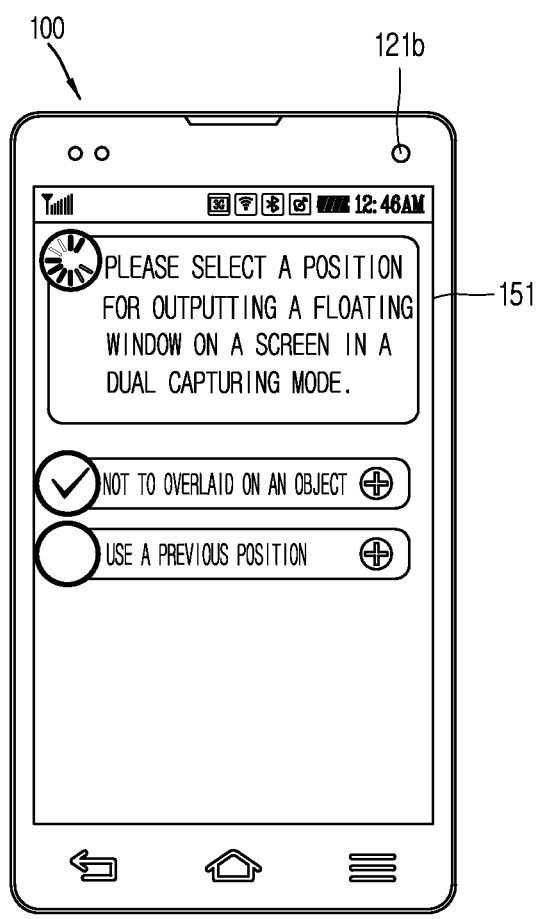
FIGS. 5 to 7 are conceptual views illustrating a method of selecting an automated position of a floating window, on which an image captured by the second camera is output, in the mobile terminal in accordance with the one exemplary embodiment.
Figure 6:
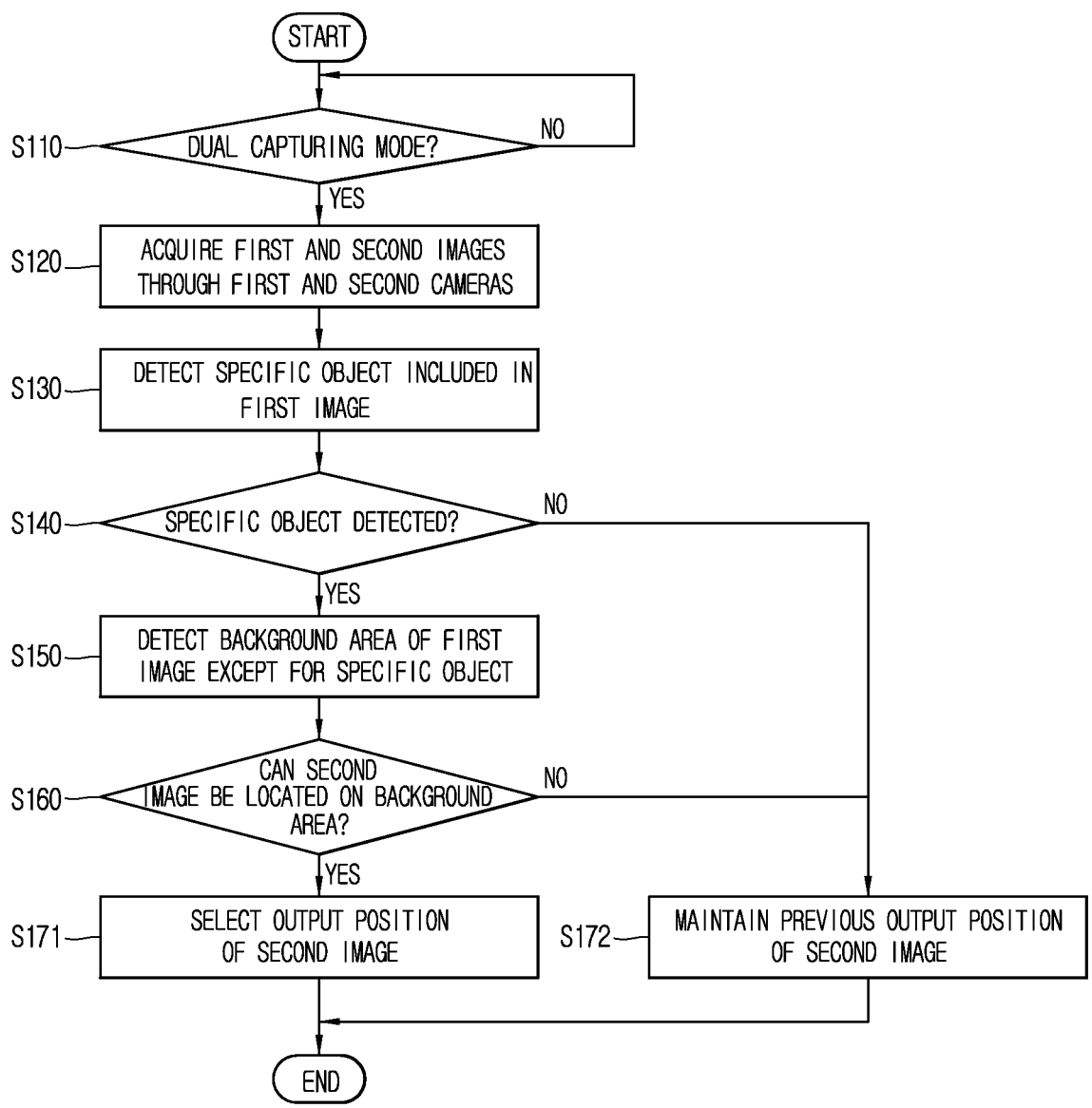
Figure 7:
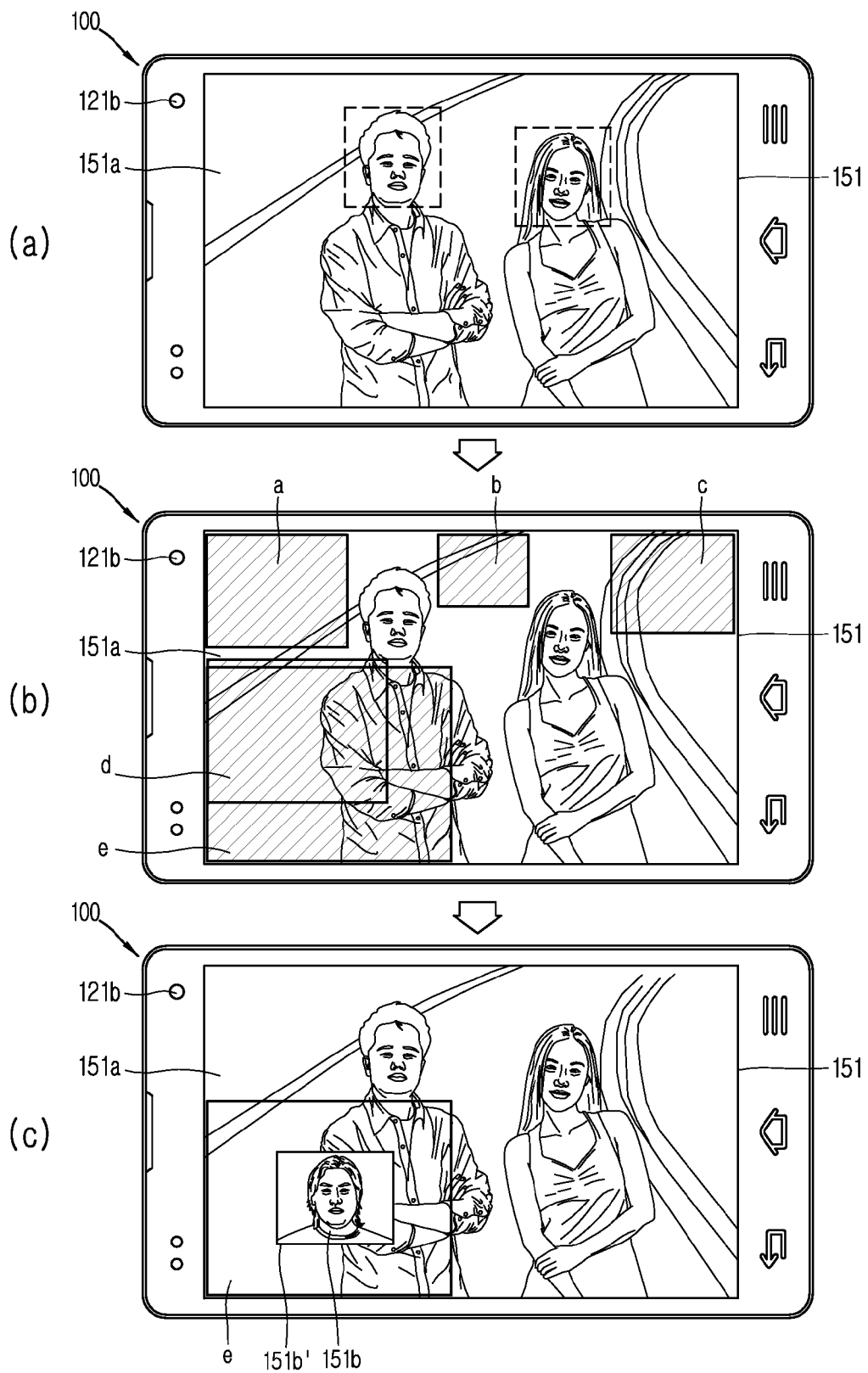

FIGS. 5 to 7 are conceptual views illustrating an automatic position selection for the floating window 151b', on which an image captured by the second camera 121b is output, in the mobile terminal 100 according to the one exemplary embodiment. For reference, FIG. 7 conceptually illustrates a process that the controller 180 selects the position of the floating window 151b'.

As illustrated in FIG. 5, the mobile terminal 100 may have a mode for setting (selecting) a position where the floating window 151b' is to be output. A setting screen for selecting the mode may be output upon execution of the dual capturing mode. Of course, the mode may be selectable on a setting screen associated with a camera function.

The controller 180 (see FIG. 1) may set the output position of the floating window 151b', in such a manner of preventing at least part of the second image 151b, which is displayed on the floating window 151b', from being overlaid on a specific object (an object to be captured) included in the first image 151a. The controller 180 may also set the floating window 151b' to be output on a previous output position without taking the specific object into account.

Meanwhile, the specific object may be a face of a person who is present in the first image 151a captured by the first camera 121a, or there may be a plurality of specific objects. However, the specific object may not be limited to those examples. The specific object may also be a thing, a creature, or the like, which meets a particular condition (for example, movement, color, size, etc.), which may be changed according to a user's setting.

Hereinafter, description will be given in more detail of one example of a control method for implementing this, with reference to a flowchart illustrated in FIG. 6.

First, the mobile terminal 100 may enter a dual capturing mode in response to a user selection (S110). The dual capturing mode may be carried out when a camera-related application is activated. The camera-related application may be activated in various manners, such as selecting an icon (or a graphic object) of the camera-related application output on the display unit 151, combining manipulation and motion made by a user, and the like.

In response to the entrance of the mobile terminal 100 into the dual capturing mode, the first and second cameras 121a and 121b may be activated to acquire first and second images 151a and 151b, respectively (S120). The display unit 151 may output the first image 151a and the second image 151b in real time. Here, the display unit 151 may also output only a part of an image captured by the second camera 121b. For example, at least part of the second image 151b may be output on the floating window 151b' which is output in a manner of overlapping a part of the first image 151a.

While the first camera 151a acquires the first image 151a, the controller 180 may detect a specific object included in the first image 151a (S130). For example, the controller 180 may be set to detect a face of a person included in the first image 151a. Here, a frame (for example, a rectangular or circular dotted line) which surrounds (selects) the face may be output on the detected person's face. When the controller 180 fails to detect the face of the person included in the first image 151a, the person's face may be selected by the user. (a) of FIG. 7 illustrates that the controller 180 has detected faces of a plurality of persons included in the first image 151a.

If the specific object has not been detected (S140), the controller 180 may output the floating window 151b', on which at least part of the second image 151b captured by the second camera 121b is displayed, on a previous position on which the floating window 151b' was output upon execution of the dual capturing mode (S172). If the dual capturing mode is executed for the first time, the floating window 151b' may be output on a position which has been set upon shipping of the mobile terminal.

When the specific object has been detected (S140), the controller 180 may detect a background area of the first image 151a except for the specific object (S150). For example, the controller 180 may detect the rest area of the first image 151a, except for the face of the person included in the first image 151a, as the background area.

Afterwards, the controller 180 may determine whether or not the floating window 151b' can be located on the background area according to a preset logic (S160).

The preset logic may be configured in various manners. For example, various logics may be stored in the mobile terminal 100 such that the user can select one logic for use. Hereinafter, description will be given in more detail of an exemplary logic of determining whether or not the floating window 151b' can be located on the background area of the first image 151a and, if possible, setting (selecting) an output position of the floating window 151b'.

As illustrated in (b) of FIG. 7, the controller 180 may divide the background area into a plurality of areas a, b, c, d and e, avoiding the person's face. Here, the plurality of areas a, b, c, d and e may have the same aspect ratio as the floating window 151b'. (b) of FIG. 7 illustrates the result that the controller 180 has extracted the areas a, b, c, d and e, which have the same aspect ratio as the floating window 151b', from the background area, in such a manner of moving from left to right and from up to down. Meanwhile, the aspect ratio of the floating window 151b' may differ according to a user's setting, or according to an orientation of the mobile terminal 100 from the ground. For example, when the mobile terminal 100 is changed into a horizontal mode (landscape mode) by 90°-rotation from a vertical mode (portrait mode), the aspect ratio may be changed.

The controller 180 may then situate the floating window 151b' on one of the plurality of areas a, b, c, d and e, and the one area may be an area having the largest size of the plurality of areas. Referring to (b) of FIG. 7, the first area a which meets the logic is extracted on a left upper end of the background area. The right second area b, which is extracted in a sequential manner, is smaller in size than the first area a. Hence, the second area b is excluded from those candidates on which the floating window 151b' is to be located. The next extracted third area c is also smaller in size than the first area a, so as to be excluded from the candidates. Afterwards, the extracted fourth area d is larger in size than the first area a. Accordingly, the fourth area d is selected as a new candidate area and the first area a is excluded from the candidate areas. The last extracted fifth area e is larger in size than the fourth area d. Therefore, the fifth area e is finally decided as the area where the floating window 151b' is to be located.

The controller 180 may output the floating window 151b' on the fifth area e which has been decided according to the logic. This exemplary embodiment illustrates that the floating window 151b', on which the at least part of the second image 151b is displayed, is output on a center of the fifth area e by being resized with maintaining the same aspect ratio. However, the method of outputting the floating window 151b' may not be limited to this. The floating window 151b' may be configured to fully fill the fifth area e, or be resized according to a preset touch input applied by the user.

In the meantime, if there is not any area which meets the preset logic and on which the floating window 151b' can be located [a case where the plurality of divided areas a, b, c, d and e are all smaller than the floating window 151b' in the above example], as aforementioned, the controller 180 may output the floating window 151b' on the previous position on which the floating window 151b' was output upon execution of the dual capturing mode (S172). Of course, the user may move the floating window 151b' to a specific position in a preset touch manner.

In this manner, in the dual capturing mode, the floating window 151b' on which the at least part of the second image 151b is displayed may be arranged by being appropriately resized for a position where it does not interfere with the face of the person captured by the first camera 121a.

Meanwhile, when the capturing composition is changed, relative positions between the specific object included in the first image 151a and the floating window 151b' may be changed. Consequently, a case may occur where the floating window 151b' obscures the specific object due to the change in the capturing composition. Hereinafter, a method of preventing this problem will be described.

Figure 8:
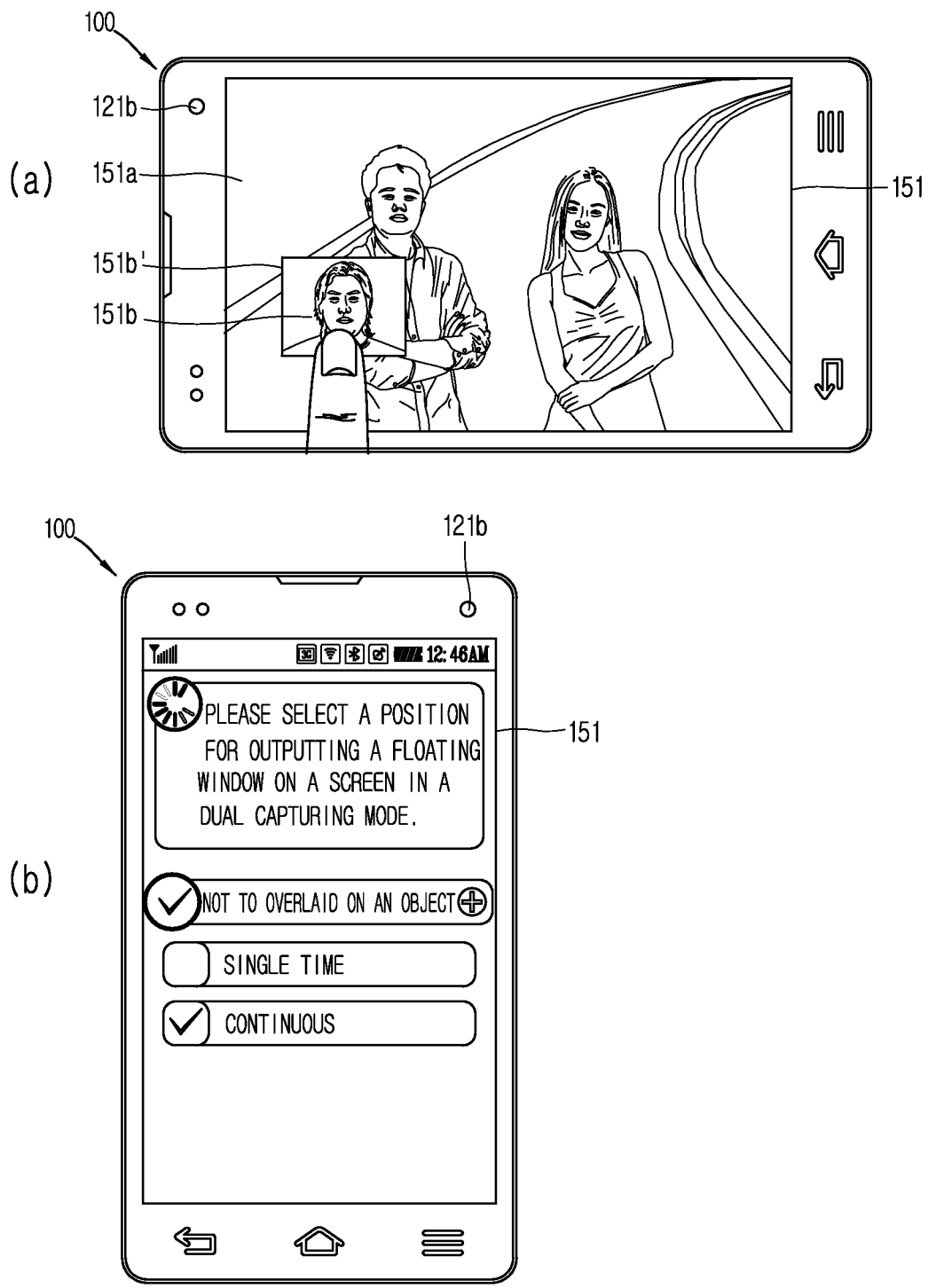
FIGS. 8 to 10 are conceptual views illustrating a continuous execution of an automatic position selection for the floating window in the mobile terminal in accordance with the one exemplary embodiment.
Figure 9:
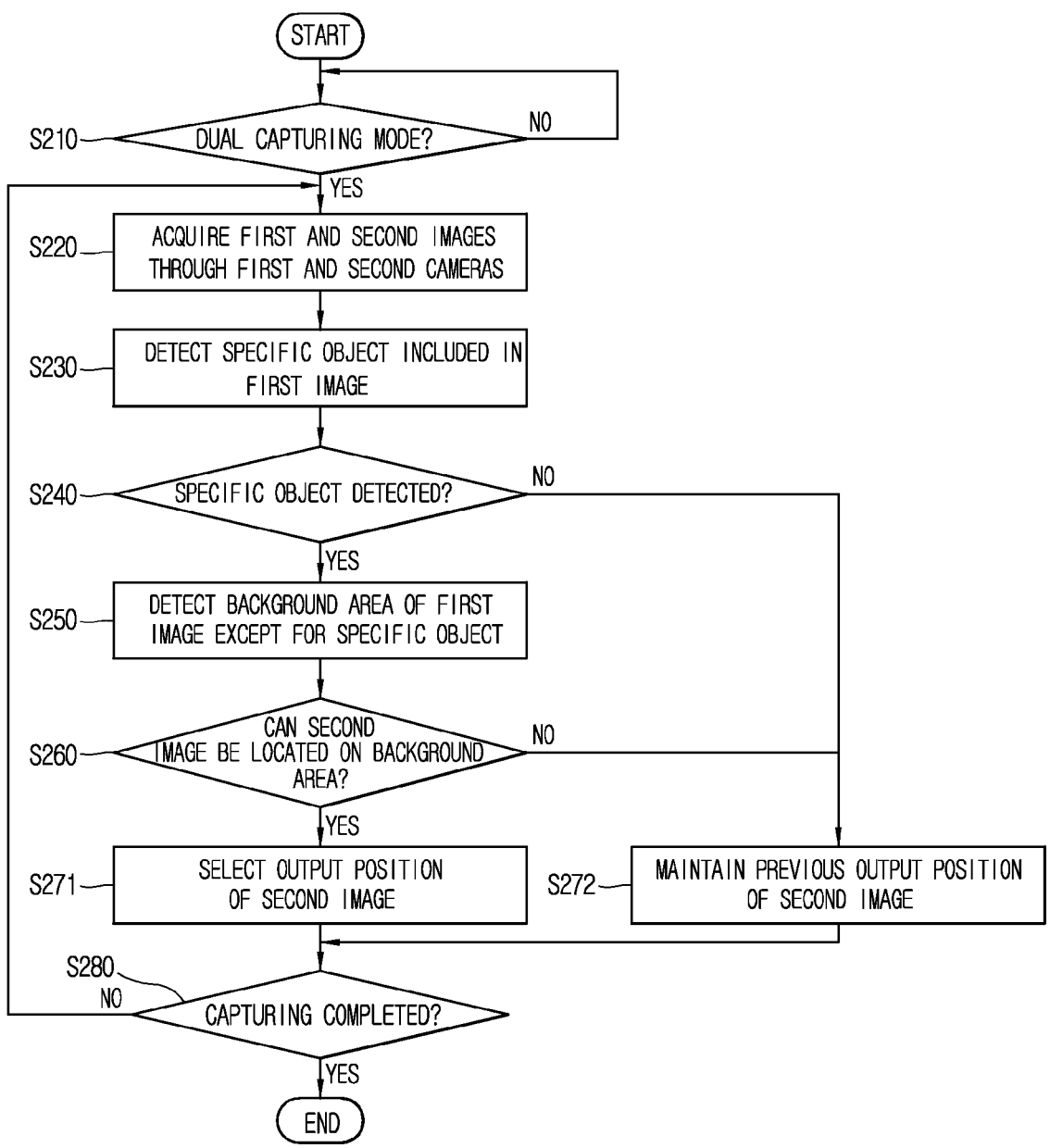
Figure 10:
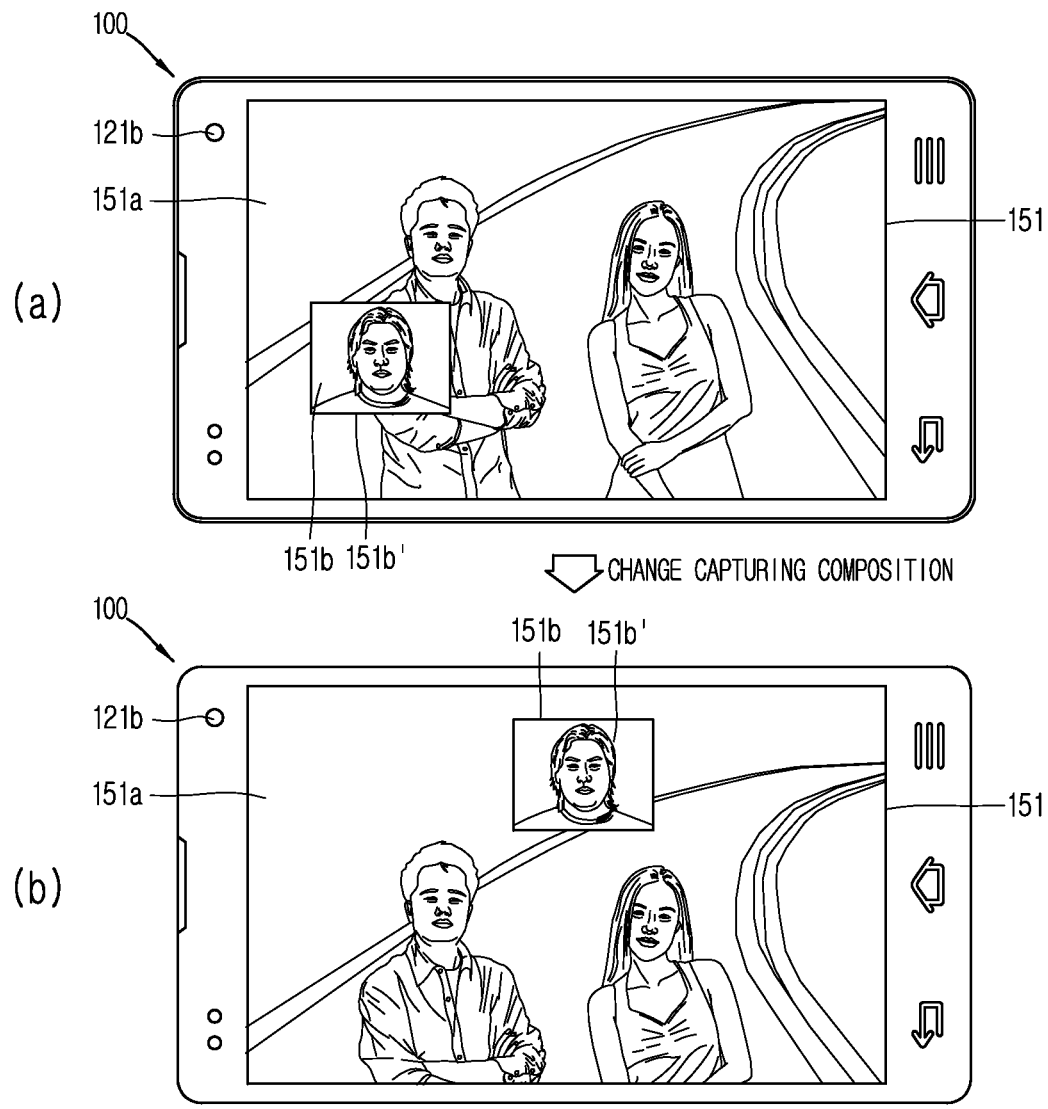

FIGS. 8 to 10 are conceptual views illustrating a continuous execution of an automatic position selection for the floating window 151b' in the mobile terminal 100 in accordance with the one exemplary embodiment.

As illustrated in FIG. 8, a mode for setting that at least part of the second image 151b displayed within the floating window 151b' is prevented from being overlaid on the specific object may include a sub mode (or a lower mode) in which it is possible to select whether the setting is activated only upon driving the dual capturing mode or is continuously activated while capturing is carried out.

A setting screen for selecting the sub mode may be output when the at least part of the second image 151b displayed within the floating window 151b' is touched in a preset manner. For example, as illustrated in FIG. 8, when a touch lasted for more than a preset time is sensed on the at least part of the second image 151b, the setting screen may be output on the display unit 151. Of course, the sub mode may also be selectable on a setting screen associated with a camera function.

Hereinafter, description will be given in more detail of an example of driving the sub mode for continuously activating the setting during the capturing, with reference to a flowchart illustrated in FIG. 9.

The flowchart illustrated in FIG. 9 may further include, in addition to those steps included in the flowchart illustrated in FIG. 6, a step of determining whether or not the capturing has been completed after selecting the output position of the second image 151b (S280). When the capturing has not been completed, the controller 180 may go back to the step of acquiring the first and second images 151a and 151b through the first and second cameras 121a and 121b (S220), and perform the step of searching for an output position where the second image 151b does not interfere with the specific object included in the first image 151a.

If the position of the specific object output on the display unit 151 is changed, the at least part of the second image 151b may be changed in position with maintaining the state of avoiding the specific object. The change in the position may include a change in a size of the specific object output on the display unit 151. The change in the output position of the specific object may be caused due to a change in a distance between the first camera 121a and the specific object, a zoom-in/out of the first camera 121a, a change in a capturing angle of the first camera 121a, and the like.

For example, when the user moves the mobile terminal 100 to make an appropriate capturing composition in an activated state of the dual capturing mode, a position of a face of a person output on the display unit 151 may be changed. The controller 180 may continuously search for the appropriate output position, such that the floating window 151b' can be output on a position where it does not interfere with the face of the person captured by the first camera 121a. The continuous search may be repeated until the capturing is completed.

According to the control method, the user may feel satisfactory when the user makes a capturing composition with viewing an object-captured image, without caring for whether the floating window 151b' interferes with the capturing by obscuring a specific object. That is, the control method may bring about an increase in user convenience in the dual capturing mode.

The control method may especially be useful when a composition is changed during capturing or upon capturing a video in which an object is moving. Therefore, when a video is captured using the first and second cameras 121a and 121b, the sub mode may be automatically set.

Meanwhile, the floating window 151b' may be output on the display unit 151 in various sizes. Hereinafter, description will be given of the way how the floating window 151b' can be output based on the aforementioned logic [the logic of selecting an area for outputting the floating window 151b' from the plurality of areas].

Figure 11:
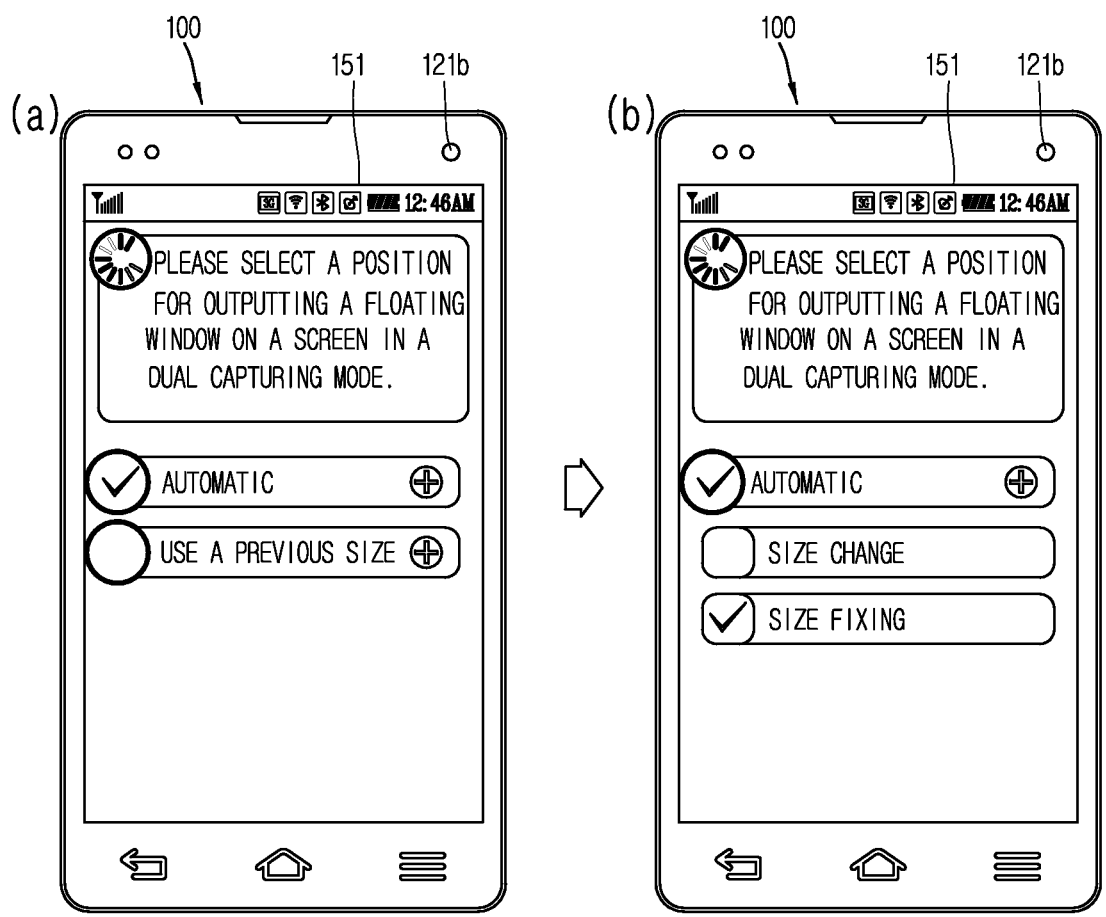
FIGS. 11 and 12 are conceptual views illustrating an automatic size setting for the floating window in the mobile terminal in accordance with the one exemplary embodiment.
Figure 12:
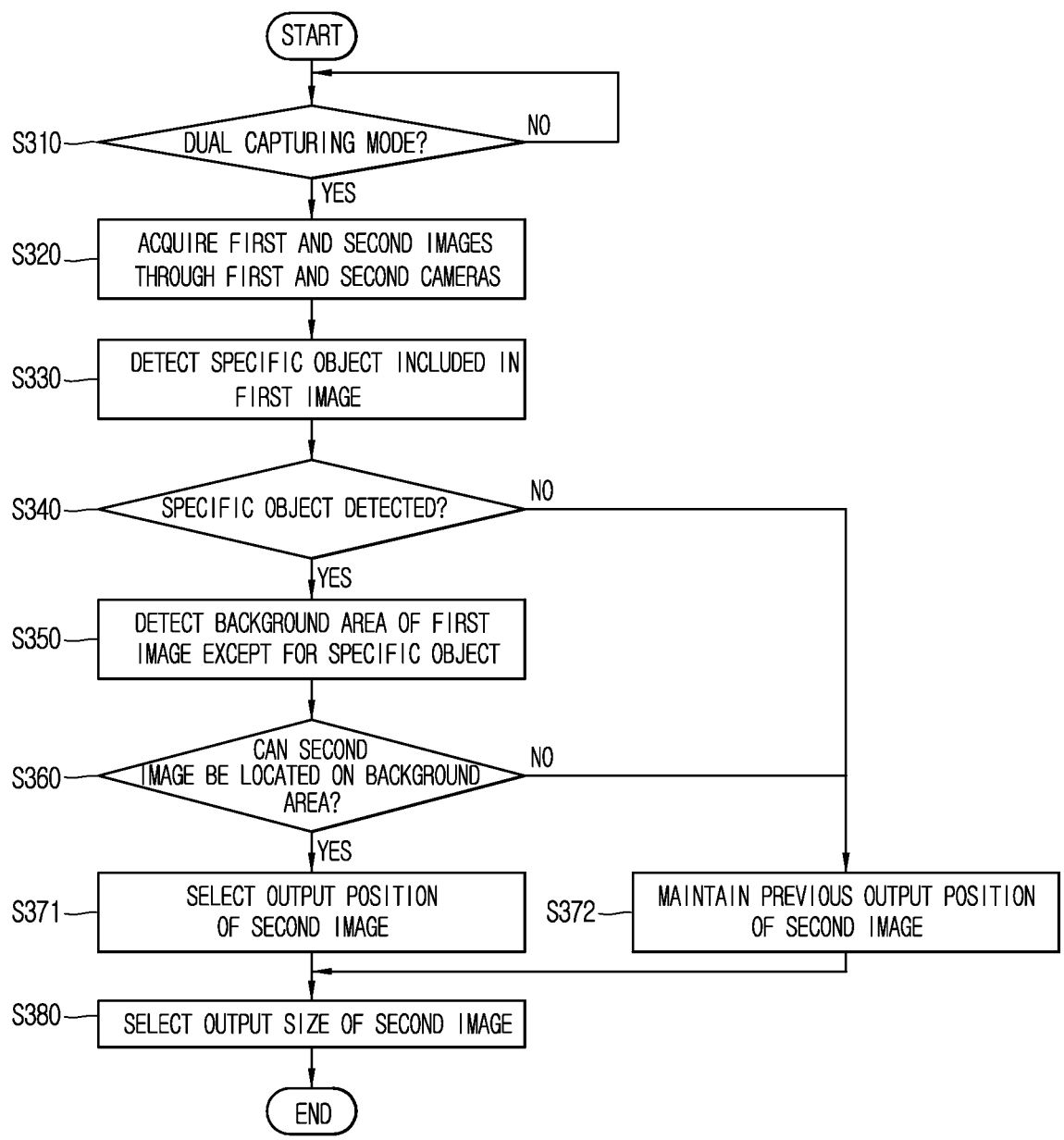

FIGS. 11 and 12 are conceptual views illustrating an automatic size setting for the floating window 151b' in the mobile terminal 100 in accordance with the one exemplary embodiment.

The controller 180 may be configured to output the floating window 151b' within an area, which is finally selected by the logic, in a specific ratio of the area. The logic is merely proposed as one example, as aforementioned, and may not be construed to limit the present disclosure. The control method disclosed herein may also be applied to the aforementioned logic and the output of the floating window 151b' on the area selected by the logic.

The mobile terminal 100 may have a mode for setting an output size of the floating window 151b'. A setting screen for selecting the mode may be output when at least part of the second image 151b displayed within the floating window 151b' is touched in a preset manner. For example, when the at least part of the second image 151b is touched for more than a predetermined time, the setting screen may be output on the display unit 151. The mode may also be selectable on a setting screen associated with a camera function.

It is illustrated in (a) of FIG. 11 that the mobile terminal 100 includes a mode of automatically setting a size of the floating window 151b', and a mode of setting a size of the floating window 151b' to a previous size which was output upon the execution of the dual capturing mode.

When the mode of automatically setting the size of the floating window 151b' is selected, as illustrated in (b) of FIG. 11, it may be possible to select a mode of outputting the floating window 151b' in a size with a specific ratio with respect to a size of a selected area and changing the size of the floating window 151b' according to the size of the selected area, which is changed in real time, and a mode of outputting the floating window 151b' in a size with a specific ratio with respect to a size of an initially selected area and maintaining the output size.

As illustrated in FIG. 12, the selection of the output size of the floating window 151b' may be executed based on a selection result of an output position of the floating window 151b' (S371). For example, the floating window 151b' may be output on a center of a selected area in a size corresponding to 25% of the selected area. Here, the ratio may be changed by a user's setting.

Hereinafter, description will be given of exemplary embodiments of a control method for producing various effects in the dual capturing mode by applying the aforementioned control method.

Figure 13A:
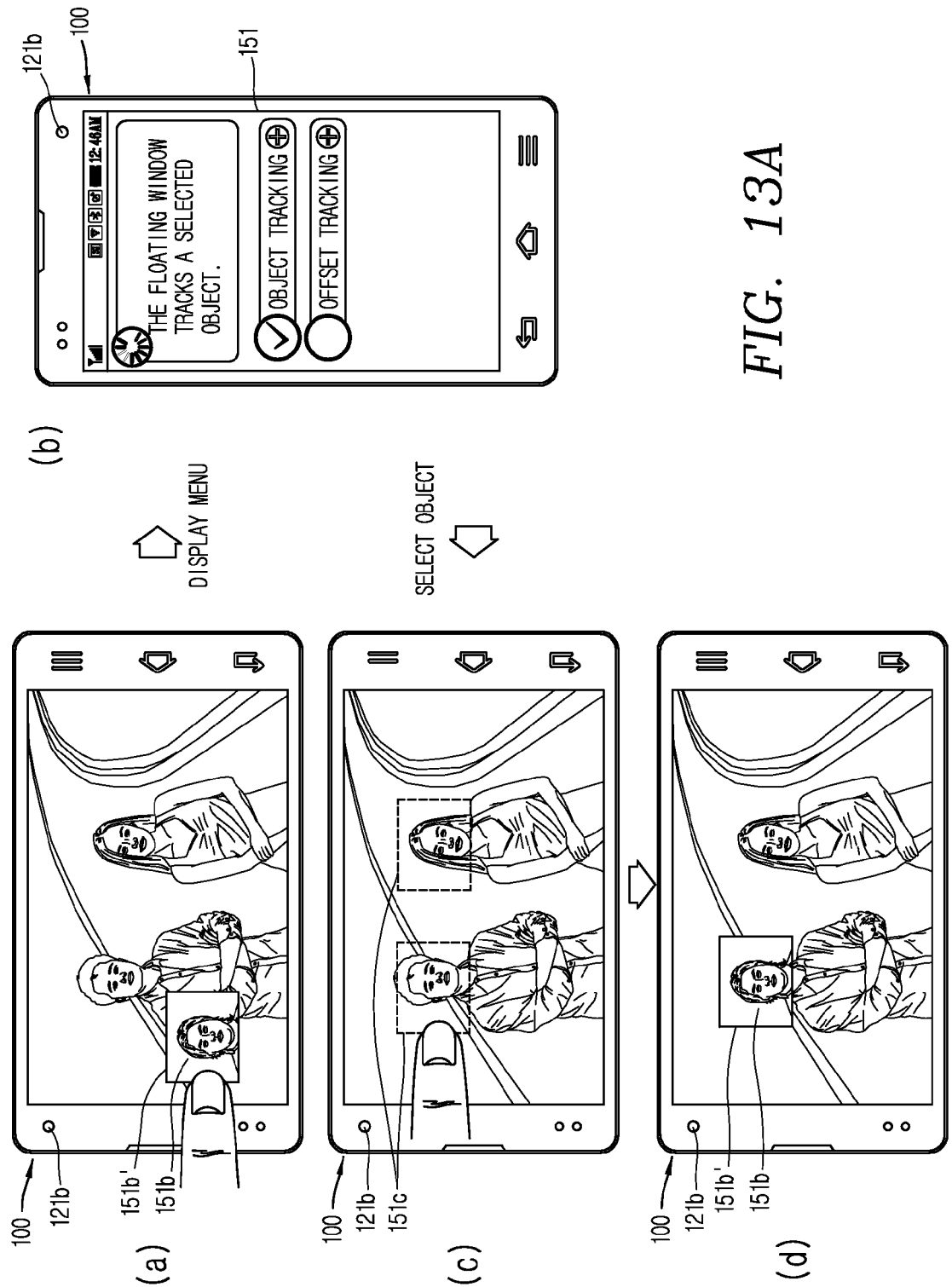
FIGS. 13A, 13B and 14 are conceptual views illustrating a method of maintaining a state that the floating window is overlaid on a specific object in the mobile terminal in accordance with the one exemplary embodiment.
Figure 13B:
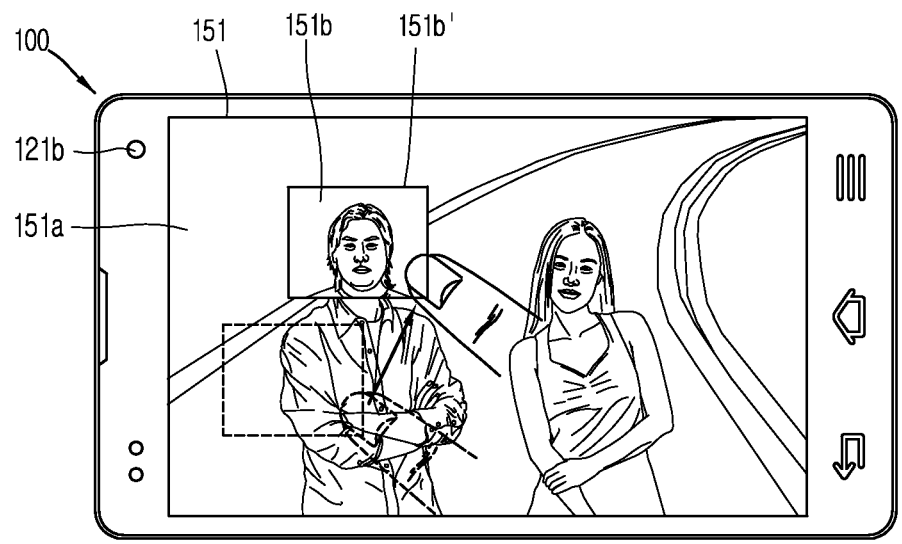
Figure 14:
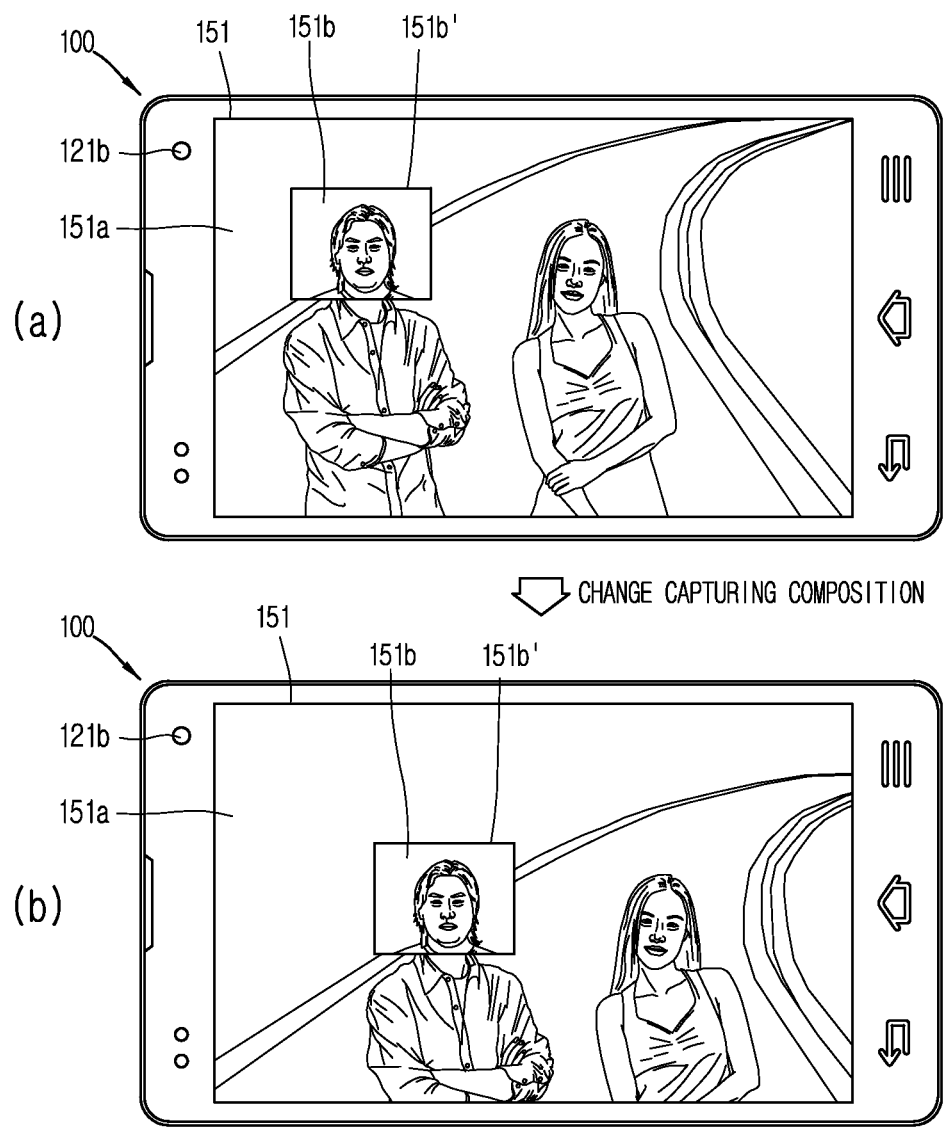

FIGS. 13A, 13B and 14 are conceptual views illustrating a method of maintaining a state that the floating window 151b' is overlaid on a specific object in the mobile terminal 100 in accordance with the one exemplary embodiment.

As aforementioned, in the dual capturing mode, the floating window 151b', within which the at least part of the second image 151b is displayed, may be output on the first image 151a in a manner of being overlaid on a part of the first image 151a. The foregoing embodiment has illustrated that the floating window 151b' is output not to be overlaid on the specific object, but these exemplary embodiments propose that the floating window 151b' is output to be continuously overlaid on the specific object.

As illustrated in FIG. 13A, in a state where the floating window 151b' is output on the display unit 151 without interfering with faces of persons included in the first image 151a, when a preset touch input is applied to the floating window 151b', a setting screen associated with object tracking may be output. The preset touch input, for example, may be a touch input which is applied to at least part of the second image 151b displayed within the floating window 151b' for more than a preset time.

When an object tracking mode is selected, the faces of persons detected may be selectably displayed on the display unit 151, respectively. For example, rectangular dotted line frames 151c surrounding the faces of the persons may be output.

When a face of a specific person is selected by a touch input, the floating window 151b' may be output to be overlaid on the face of the specific person. Accordingly, the specific person's face may seem to be changed to the face of the user who is capturing the specific person's face. That is, an effect similar to a composite image can be produced.

Meanwhile, a more simplified method, which is different from the aforementioned method, may also be employed to track an object. As illustrated in FIG. 13B, when at least part of the second image 151b displayed within the floating window 151b' is touched and dragged, the floating window 151b' may be movable along the drag input. Here, when the floating window 151b' approaches the specific person's face within a predetermined range, the floating window 151b' may be output to be overlaid on the specific person's face.

During this process, when the floating window 151b' approaches the specific person's face within the predetermined range, the floating window 151b' may be attracted to the specific person's face so as to be overlaid on the face even though the touch onto the floating window 151b' is released. That is, the floating window 151b' may be attracted, like a magnet, to be overlaid on the specific person's face.

According to the method, a selection of an object tracking mode, a selection of an object, and the like may be simultaneously achieved by touch & drag. Therefore, the method may be very useful in view of a characteristic of image capturing or video capturing with an emphasis on catching and recording of unexpected moments.

In the meantime, in order to minimize a sense of difference between the first image 151a and the at least part of the second image 151b displayed within the floating window 151b', the second camera 121b may be set to the same setting value as the first camera 121a. For example, when the first camera 121a is set to a black-and-white capture in the object tracking mode, the setting value of the second camera 1212b may be changed to the black-and-white capture to be the same as the setting value of the first camera 121a. This may be applied to the overall dual capturing mode as well as the object tracking mode.

Also, the controller 180 may adjust a size of the user's face displayed on the floating window 151b' such that the user's face can have a similar/like size to the selected specific person's face. To implement this, the size of the floating window 151b' or the size of the user's face displayed on the floating window 151b' may be adjustable.

When at least one of a position and a size of a specific object output on the display unit 151 is changed, at least one of a position and a size of the at least part of the second image 151b may be changed while it continuously obscures the specific object. Referring to FIG. 14, the controller 180 may move the output position of the floating window 151b' when the position of the selected person's face is changed, such that the floating window 151b' can be continuously overlaid on the selected person's face even when the output position of the selected person's face on the display unit 151 is changed.

Figure 15:
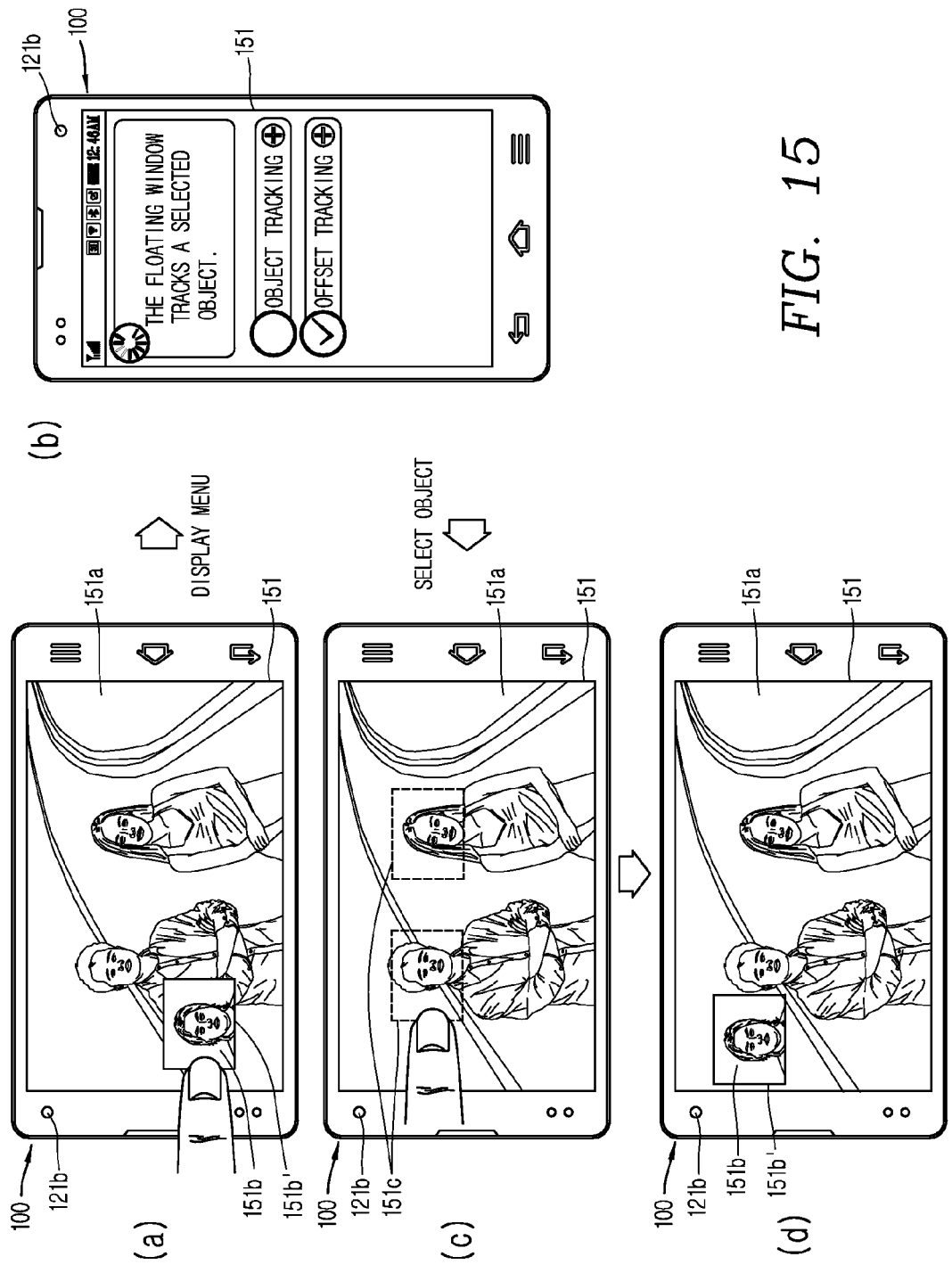
FIGS. 15 and 16 are conceptual views illustrating a method of maintaining a preset interval between the floating window and a designated specific object in the mobile terminal in accordance with the one exemplary embodiment.
Figure 16:
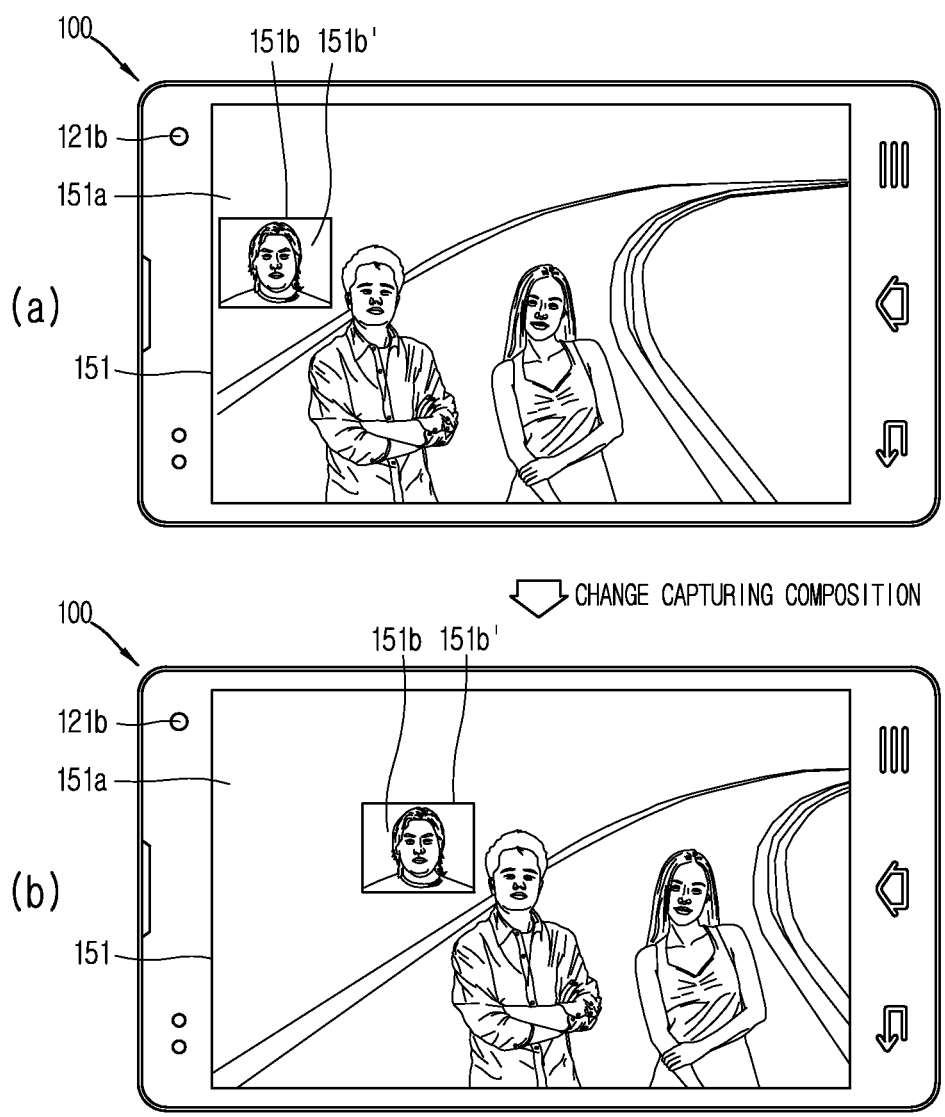

FIGS. 15 and 16 are conceptual views illustrating a method of maintaining a preset interval between the floating window 151b' and a designated specific object in the mobile terminal 100 in accordance with the one exemplary embodiment.

This exemplary embodiment is a variation of the aforementioned object tracking method, and propose a method in which the floating window 151b' is output with maintaining a preset interval from the specific object.

As illustrated in FIG. 15, in a state where the floating window 151b' is output on the display unit 151 without being overlaid on faces of persons included in the first image 151a, when a preset touch input is applied to the floating window 151b', a setting screen associated with object tracking may be output. The preset touch input, for example, may be a touch input applied to at least part of the second image 151b for more than a predetermined time.

When an offset tracking mode in which the floating window 151b' is output with a preset interval from a specific object is selected, the faces of persons detected may be selectably displayed on the display unit 151, respectively. For example, rectangular frames 151c surrounding the persons' faces may be displayed.

When a specific person's face is selected by a touch input, the floating window 151b' may be output with a preset interval from the specific person's face. Also, as illustrated in FIG. 16, when the specific person's face displayed on the display unit 151 is moved in response to a change in a capturing composition, the floating window 151b' may be moved with maintaining the preset interval from the specific person's face. Accordingly, it may seem that the user is present with the specific person.

Here, the preset interval between the specific object and the floating window 151b' may be set based on a touch input. For example, when at least part of the second image 151b displayed on the floating window 151b' illustrated in (d) of FIG. 15 is touched and dragged, the floating window 151b' may be moved along the drag input. Afterwards, when the touch is released on a specific point, the controller 180 may set an interval between the selected person's face and the touch-released point as the preset interval.

Meanwhile, when the user views an object-captured image, the user may be difficult to pay attention to an image capturing the user himself/herself. Further, when a part of the second image 151b is displayed within the floating window 151b', the user may feel difficult in placing his/her face within the floating window 151b'. Hereinafter, description will be given of the mobile terminal 100 which is capable of increasing user convenience by solving the issue.

Figure 17:
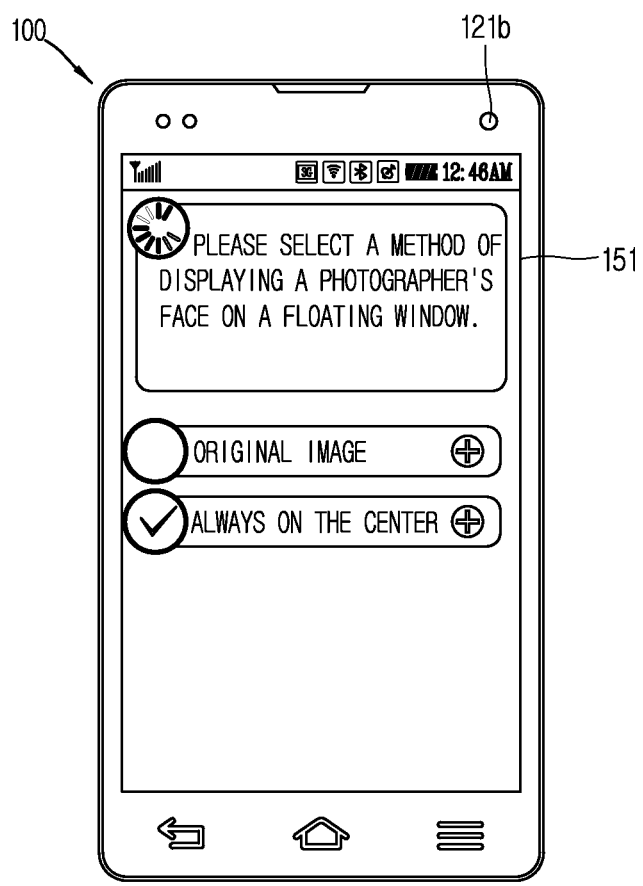
FIGS. 17 to 19 are conceptual views illustrating a method of always putting a specific object, which is included in a second image captured by the second camera, within the floating window in the mobile terminal in accordance with the one exemplary embodiment.
Figure 18:
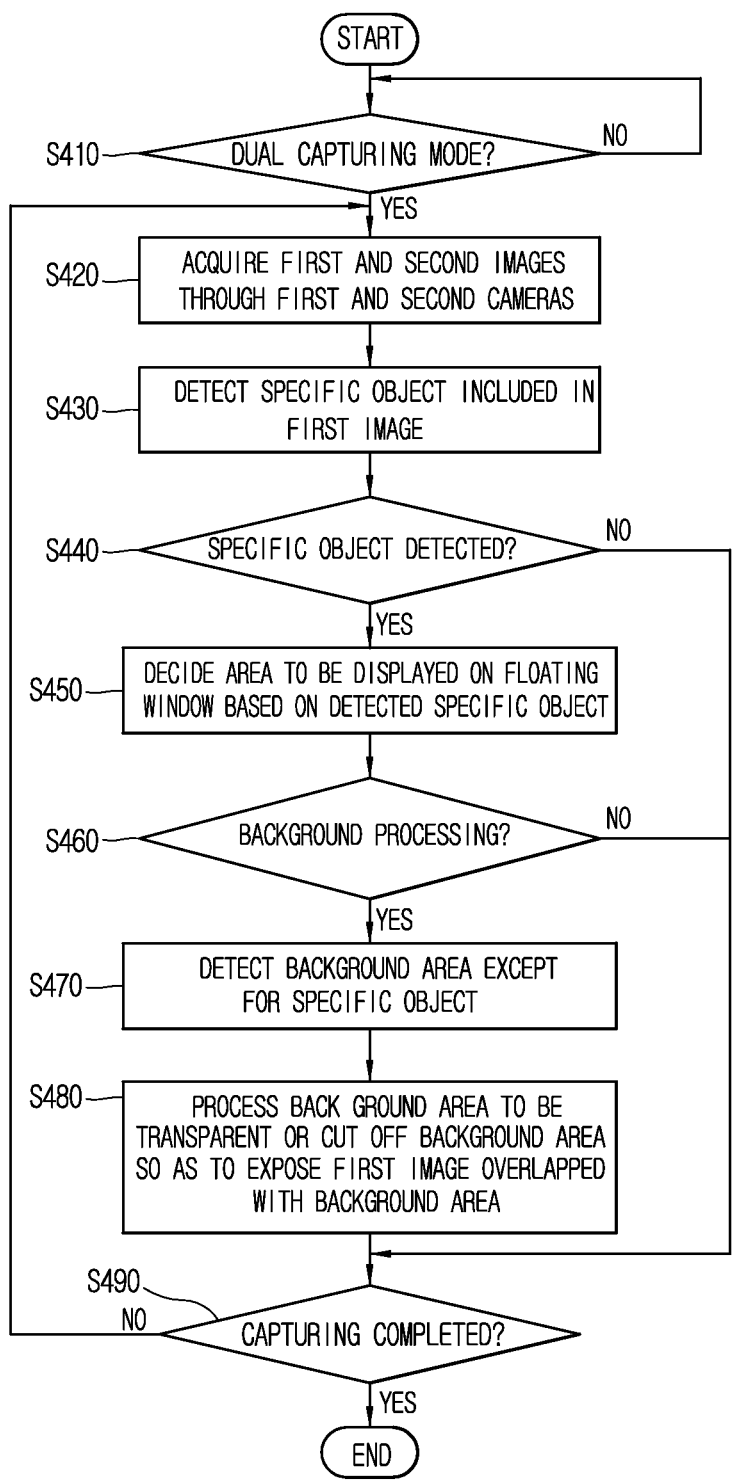
Figure 19:
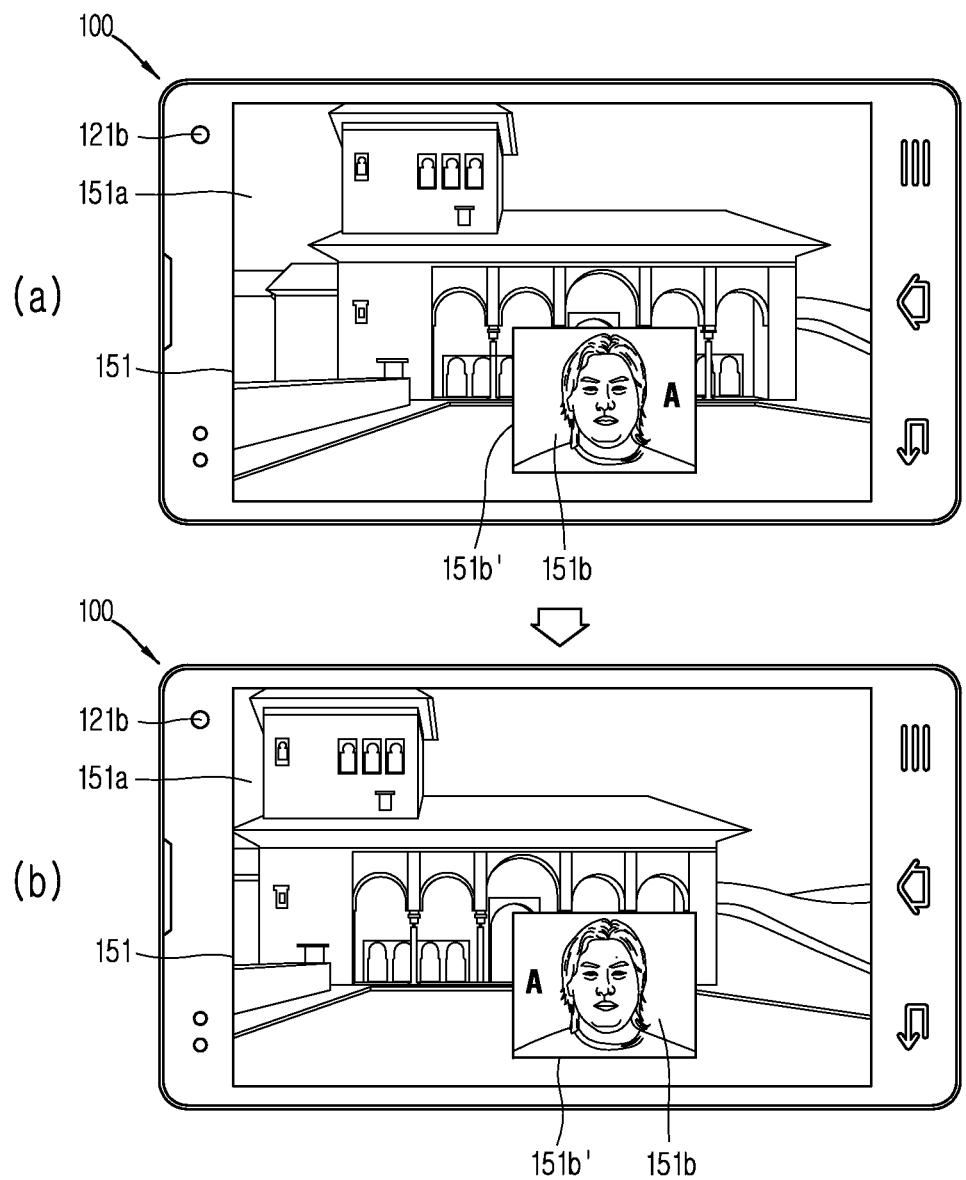

FIGS. 17 to 19 are conceptual views illustrating a method of always placing a specific object, which is included in the second image 151b captured by the second camera 121b, within the floating window 151b' in the mobile terminal 100 in accordance with the one exemplary embodiment.

As illustrated in FIG. 17, the dual capturing mode may include a sub mode of selecting whether to output the original second image 151b captured by the second camera 121b on the floating window 151b', or to detect the user's face included in the second image 151b and place the detected user's face within the floating window 151b'. Upon selecting a mode of always placing the user's face on a center of the floating window 151b', the user may not need to care for whether he/she is located properly within the floating window 151b'. This may result in an increase in user convenience in the dual capturing mode.

Hereinafter, an exemplary embodiment of a control method for implementing this will be described in more detail with reference to a flowchart illustrated in FIG. 18.

As illustrated in FIG. 18, when the mobile terminal 100 enters the dual capturing mode in response to a user selection (S410), the first and second cameras 121a and 121b may be activated to acquire the first and second images 151a and 151b, respectively (S420). The first image 151a and the second image 151b may be output on the display unit 151 in real time. Here, the display unit 151 may output a part of an image captured by the second camera 121b. For example, at least part of the second image 151b may be displayed within the floating window 151b' which is output in a manner of being overlaid on a part of the first image 151a.

While the second camera 121b captures the second image 151b, the controller 180 may detect a specific object included in the second image 151b (S430). For example, the controller 180 may be set to detect a face of a person (user) included in the second image 151b. Here, the detected face of the person may be output along with a frame (for example, a rectangular or circular edge) surrounding the face. When the controller 180 fails to detect the user's face included in the second image 151b, the user's face may be selected by the user.

If the user's face has not been detected (S440), the controller 180 may display at least part of the second image 151b captured by the second camera 121b on the floating window 151b', and keep monitoring whether or not the user's face is included in the second image 151b.

When the user's face has been detected (S440), the controller 180 may decide an area to be displayed within the floating window 151b' based on the user's face. For example, a preset area based on a center of the detected user's face may be decided as the area to be displayed within the floating window 151b'.

As illustrated in FIG. 19, when relative positions between the second camera 121b and the user's face are changed, the area to be displayed may be changed accordingly. For example, when a capturing composition of the second camera 121b is changed due to the movement of the mobile terminal 100, the preset area based on the center of the detected user's face may be continuously monitored and displayed within the floating window 151b'.

Afterwards, the controller 180 may decide whether or not to perform background processing (S460). The background processing may refer to outputting only the user's face of the second image 151b on the display unit 151. Whether or not to perform the background processing may be preset. Or, a popup window which asks for whether or not to perform the background processing may be set to be open when the user's face is recognized.

When the background processing is performed, the controller 180 may detect a background area except for the user's face from the preset area. Afterwards, the controller 180 may process the background area to be transparent or cut off the background area such that the first image 151a which overlaps the background area is exposed.

When the background processing is not performed, the controller 180 may display shooting information (or screen information) within the preset area, on the floating window 151b'.

According to the aforementioned control method, the user's face may be always located within the floating window 151b', which may facilitate the user to do the dual capturing in a convenient manner. When the background processing is performed, the user's face captured by the second camera 121b can be more harmonized with the first image 151a. For example, when the control method is applied to the aforementioned object tracking mode, it may arouse a more natural feeling.

Hereinafter, a method of displaying a specific object in an appropriate size within the floating window 151b' will be described.

Figure 20:
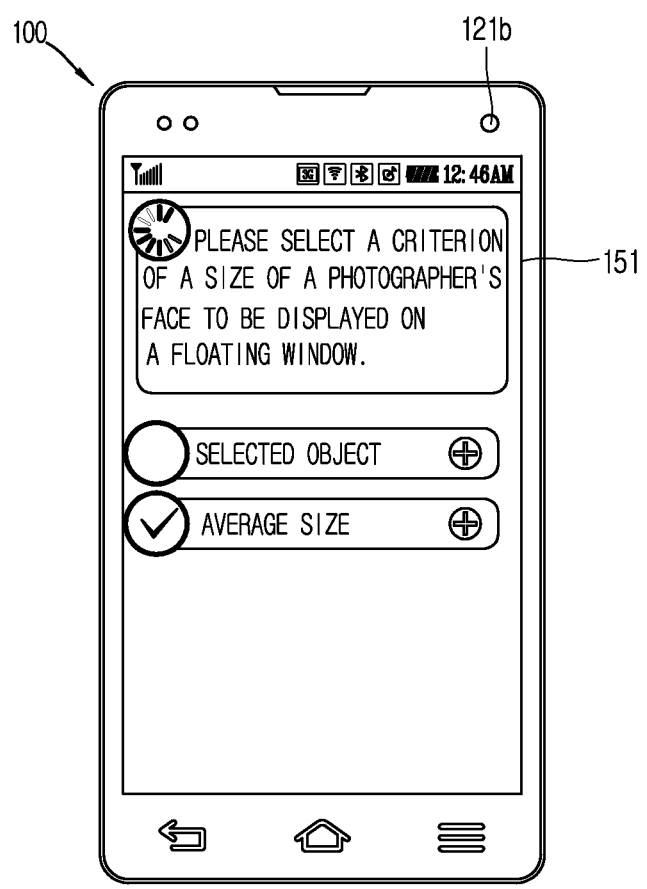
FIGS. 20 to 22 are conceptual views illustrating a method of outputting a specific object, which is included in a second image captured by the second camera, in a manner of adjusting a size of the specific object to be appropriate for the floating window according to sizes of objects included in a first image captured by the first camera in the mobile terminal in accordance with the one exemplary embodiment.
Figure 21:
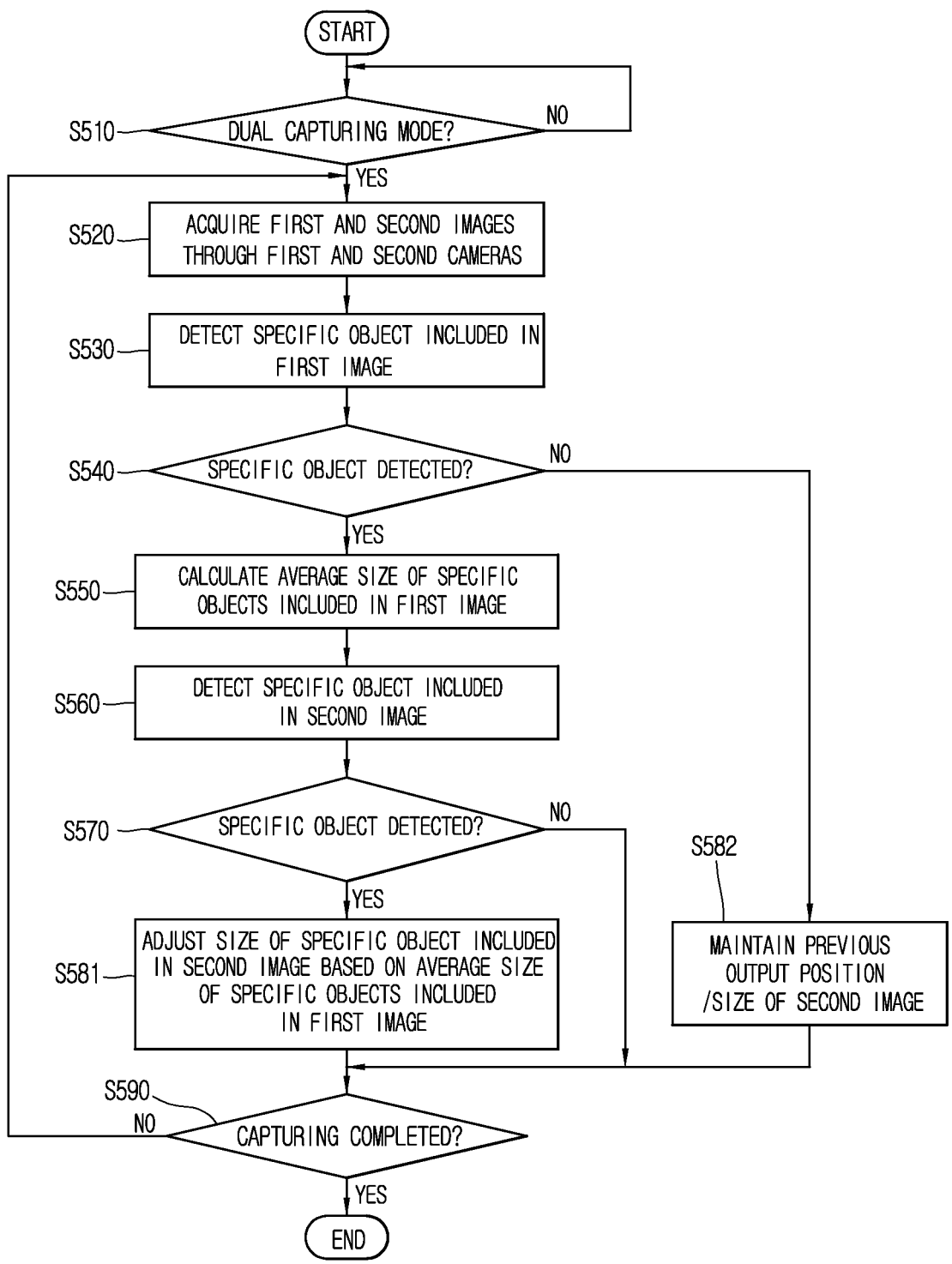
Figure 22:
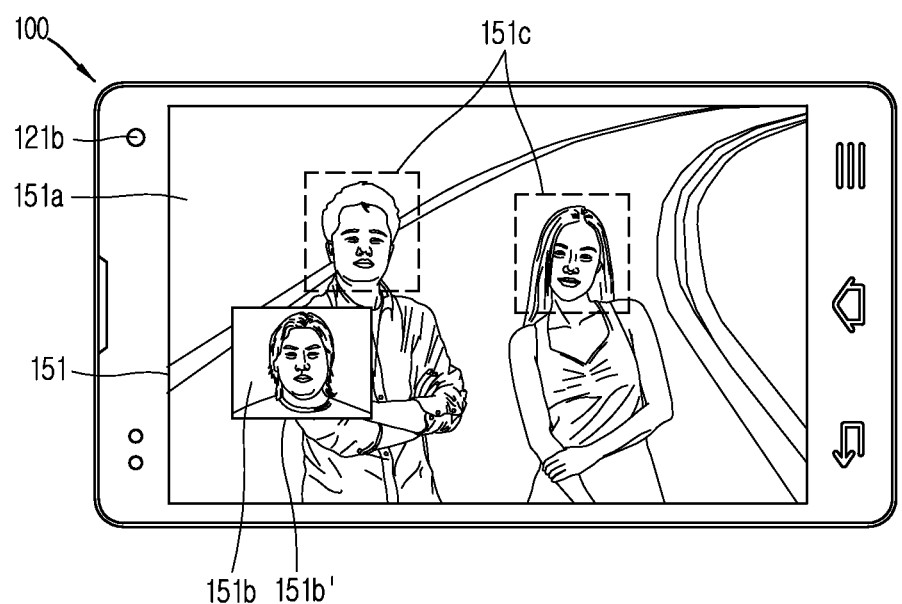

FIGS. 20 to 22 are conceptual views illustrating a method of outputting a specific object, which is included in the second image 151b captured by the second camera 121b, in a manner of adjusting a size of the specific object to be appropriate for the floating window 151b' according to sizes of objects included in the first image 151a captured by the first camera 121a in the mobile terminal 100 in accordance with the one exemplary embodiment.

As illustrated in FIG. 20, the dual capturing mode may include a sub mode of setting how large or small the user's face captured by the second camera 121b is output. For example, the sub mode may be a mode of setting a user's face to an average face size of persons captured by the first camera 121a, or setting the user's face to a selected specific person's face.

The sub mode may reduce an unnatural feeling, which results from a difference between a size of the person's face captured by the first camera 121a and a size of the person's face captured by the second camera 121b.

Hereinafter, description will be given in more detail of an exemplary embodiment of a control method of setting the user's face to the average face size of the persons captured by the first camera 121a.

As illustrated in FIG. 21, when the mobile terminal 100 enters the dual capturing mode in response to a user selection (S510), the first and second cameras 121a and 121b may be activated to acquire first and second images 151a and 151b, respectively (S520). The display unit 151 may output the first image 151a and the second image 151b in real time.

While the first camera 121a captures the first image 151a, the controller 180 may detect a specific object included in the first image 151a (S530). For example, the controller 180 may be set to detect a face of a person included in the first image 151a.

When the person's face has not been detected (S540), at least part of the second image 151b may be output in the same size on a position where it was output previously (S582). That is, the user's face included in the second image 151b may also be output in the same size as the previous size.

When the person's face has been detected (S540), a frame (for example, a rectangular or circular edge) surrounding the face may be output on the person's face. When the controller 180 fails to detect the person's face included in the first image 151a, the person's face may be selected by the user. FIG. 22 illustrates that the controller 180 detects faces of persons included in the first image 151a and the detected faces are displayed within rectangular frames 151c.

Afterwards, the controller 180 may detect sizes of the detected persons' faces and calculate an average value of those sizes (S550).

Next, the controller 180 may detect the user's face included in the second image 121b and a size of the user's face (S560). The frame (for example, a rectangular or circular edge) surrounding the face may be output on the detected user's face. When the controller 180 fails to detect the user's face included in the second image 151b, the user's face may be selected by the user.

Afterwards, the controller 180 may adjust the size of the user's face included in the second image 151b based on the calculated average value (S581). For example, when the average value is smaller than the size of the user's face, the controller 180 may display the user's face on the floating window 151b' by reducing the size of the user's face with maintaining a ratio.

According to the control method, the user's face captured by the second camera 121b may be more harmonized with the person's face captured by the first camera 121a.

Meanwhile, the aforementioned display methods for the second image 151b may be employed in the form of combination. Also, the displaying method for the second image 151b may be set to be driven in the overall dual capturing mode. For example, when the displaying method for the second image 151b is applied to the object tracking mode, displayed images can arouse a more natural feeling of a composite photograph.

In accordance with the present disclosure, in the dual capturing mode, an output position of a floating window displayed on an image captured by a second camera may be set based on a position of a specific object captured by a first camera. For example, the floating window may be arranged in an appropriate size on a position where it is not overlaid on a face of a person captured by the first camera. Also, the floating window may be configured to continuously track a user-selected specific object, and a user's face may be placed in an appropriate size within the floating window.

Accordingly, the user may feel satisfactory when the user makes a capturing composition with viewing an image with an object captured, without caring for positions of images output on a display unit and whether the user is positioned appropriately within the floating window. In this manner, the present disclosure may arouse an increase in user convenience in the dual capturing mode.

The configurations and methods of the mobile terminal and the control method thereof in the aforesaid embodiments may not be limitedly applied, but such embodiments may be configured by a selective combination of all or part of the embodiments so as to implement many variations.

What is claimed is:
1. A mobile terminal comprising:
   a first camera;
   a second camera;
   a display; and
   a controller configured to:
   cause the display to display a first image captured by the first camera, the first image comprising a specific object; and
   cause the display to display a second image captured by the second camera, wherein the second image is displayed as a floating window to overlap only a portion of the displayed first image and not obscure the specific object of the first image;
   wherein the first image and the second image are captured simultaneously, and
   wherein a position of the floating window is determined by dividing an entire area of the first image excluding the specific object of the first image into a plurality of regions each having a same aspect ratio as the floating window, and placing the floating window at a center of a largest one of the plurality of regions.

2. The mobile terminal of claim 1, wherein the controller is further configured to change a position of the second image when a position of the specific object changes in the first image such that the second image in the changed position does not obscure the specific object.

3. The mobile terminal of claim 1, wherein the controller is further configured to change a position of the second image to obscure the specific object in response to a received input.

4. The mobile terminal of claim 3, wherein:
the display comprises a touchscreen;
the received input comprises a touch and drag input for moving the second image; and
the controller is further configured to cause the second image to overlap the specific object when the second image is moved within a threshold distance from the specific object.

5. The mobile terminal of claim 4, wherein the controller is further configured to change a size or the position of the second image to correspond to a size or a position of the obscured specific object such that the specific object remains obscured when the size or the position of the specific object is changed.

6. The mobile terminal of claim 1, wherein the controller is further configured to change a position of the second image when a position of the specific object is changed such that the second image is displayed at a constant distance apart from the specific object.

7. The mobile terminal of claim 6, wherein:
the display comprises a touchscreen; and
the controller is further configured to:
change the position of the second image in response to a touch input comprising a touch and drag input for moving the second image; and
set the constant distance to a distance between the changed position of the second image and the specific object.

8. The mobile terminal of claim 1, wherein:
the second image is a portion of a total second camera image captured by the second camera; and
the controller is further configured to set the second image based on a position of a face of a person detected in the total second camera image.

9. The mobile terminal of claim 8, wherein the controller is further configured to:
identify a background area of the second image, wherein the background area excludes the detected face of the person; and
cause the display to display the second image such that the background area is transparent and a portion of the first image overlapped by the background area is visible.

10. The mobile terminal of claim 1, wherein the specific object is a first face of a first person displayed in the first image, and the controller is further configured to change a size of a second face of a second person displayed in the second image based on a size of the first face.

11. A control method for a mobile terminal, the method comprising:
capturing a first image via a first camera of the mobile terminal;
capturing a second image via a second camera of the mobile terminal simultaneously with the first image being captured;
displaying on a display the first image as a floating window comprising a specific object; and
displaying on the display the second image to overlap only a portion of the displayed first image, wherein a position of the second image is based on a position of the specific object of the first image,
wherein a position of the floating window is determined by dividing an entire area of the first image excluding the specific object of the first image into a plurality of regions each having a same aspect ratio as the floating window, and placing the floating window at a center of a largest one of the plurality of regions.

12. The method of claim 11, wherein the position of the second image is set such that the second image does not obscure the specific object of the first image.

13. The method of claim 11, further comprising changing a size or the position of the second image when a size or a position of the specific object is changed.

14. The method of claim 13, wherein the position of the second image is changed such that the second image is displayed at a constant distance apart from the specific object when the position of the specific object is changed.

15. The method of claim 14, further comprising:
changing a position of the second image in response to a touch input comprising a touch and drag input for moving the second image; and
setting the constant distance to a distance between the changed position of the second image and the specific object.

16. The method of claim 11, further comprising:
detecting a face of a person in a total second camera image captured by the second camera; and
setting the second image as a portion of the total second camera image based on a position of the detected face within the total second camera image.

17. The method of claim 16, further comprising:
identifying a background area of the second image, wherein the background area excludes the detected face of the person; and
displaying the second image such that the background area is transparent and a portion of the first image overlapped by the background area is visible.

18. The method of claim 11, further comprising:
detecting a first face of a first person in the first image;
detecting a second face of a second person in the second image; and
changing a size of the second face based on a change of a size of the first face.

19. The method of claim 11, further comprising changing the position the second image to overlap the specific object when the second image is moved within a threshold distance from the specific object in response to a touch input.

* * * * *